(12) United States Patent
Summit

(10) Patent No.: US 11,331,557 B2
(45) Date of Patent: *May 17, 2022

(54) VIRTUAL REALITY HAPTIC SYSTEM AND APPARATUS

(71) Applicant: Ethereal Matter, Inc., Mill Valley, CA (US)

(72) Inventor: Scott Summit, Mill Valley, CA (US)

(73) Assignee: Ethereal Matter, Inc., Mill Valley, CA (US)

(*) Notice: Subject to any disclaimer, the term of this patent is extended or adjusted under 35 U.S.C. 154(b) by 53 days.

This patent is subject to a terminal disclaimer.

(21) Appl. No.: 16/603,690

(22) PCT Filed: Apr. 19, 2018

(86) PCT No.: PCT/US2018/028423
§ 371 (c)(1),
(2) Date: Oct. 8, 2019

(87) PCT Pub. No.: WO2018/195344
PCT Pub. Date: Oct. 25, 2018

(65) Prior Publication Data
US 2021/0096648 A1    Apr. 1, 2021

Related U.S. Application Data

(63) Continuation of application No. PCT/US2017/028460, filed on Apr. 19, 2017.

(51) Int. Cl.
*G06F 3/01* (2006.01)
*A63F 13/65* (2014.01)
*A63F 13/285* (2014.01)
*A63B 21/00* (2006.01)
*A63B 71/06* (2006.01)
*A63B 69/00* (2006.01)
*A63B 24/00* (2006.01)
(Continued)

(52) U.S. Cl.
CPC .... *A63B 71/0622* (2013.01); *A63B 21/00181* (2013.01); *A63B 24/00* (2013.01); *A63B 69/0048* (2013.01); *A63F 13/28* (2014.09); *A63F 13/90* (2014.09); *G06F 3/011* (2013.01); *G06F 3/016* (2013.01); *A63B 2071/0644* (2013.01); *A63F 2300/8082* (2013.01); *G06F 2203/012* (2013.01)

(58) Field of Classification Search
None
See application file for complete search history.

(56) References Cited

U.S. PATENT DOCUMENTS 10,307,663 B1 * 6/2019 Bates ............... A63F 13/843
10,646,768 B2 * 5/2020 Summit ............ A63B 24/00
(Continued)

*Primary Examiner* — Tize Ma
(74) *Attorney, Agent, or Firm* — Staniford Tomita LLP

(57) ABSTRACT

A virtual reality (VR) system includes a VR display and a VR movement apparatus that includes hand interfaces and foot interfaces that can support the hands and feet of a system user. The VR movement apparatus allow the user's limbs to move in 3-dimensional space that include vertical, lateral, and fore-aft direction movements. A computer running VR software coordinate and synchronizes the VR movement apparatus and the VR display to provide system users with simulated activities in a VR environment.

29 Claims, 35 Drawing Sheets

(51) Int. Cl.
*A63F 13/28* (2014.01)
*A63F 13/90* (2014.01)

(56) References Cited

U.S. PATENT DOCUMENTS

| | | | |
|---|---|---|---|
| 2004/0077464 A1* | 4/2004 | Feldman | A63B 22/0007 |
| | | | 482/57 |
| 2007/0171199 A1* | 7/2007 | Gosselin | A61H 3/008 |
| | | | 345/156 |
| 2010/0145233 A1* | 6/2010 | Zhang | A61B 5/1124 |
| | | | 600/592 |
| 2010/0279255 A1* | 11/2010 | Williams, II | G09B 9/14 |
| | | | 434/29 |

* cited by examiner

VIRTUAL REALITY HAPTIC SYSTEM AND APPARATUS

CROSS REFERENCE TO RELATED APPLICATIONS

This application claims priority to International Patent Application No. PCT/US2017/028460, "Virtual Reality Haptic System And Apparatus" filed Apr. 19, 2017 which is hereby incorporated by reference in its entirety.

BACKGROUND

Virtual reality (VR) systems are computer-based systems that provide experiences to a participant acting in a simulated environment that forms a three dimensional virtual world. Most VR system use a visual headset that allows the user to view and virtually move within a computer generated environment. Some VR system improve upon the visual experience by adding mechanical devices that are coupled to the body of the user to provide tactile forces or resistance to the movement of the user's body. However, these types of VR suits are often complex mechanical devices that must be worn by the user. Others offer only a limited haptic experience that loses its appeal due to an uncompelling overall experience. Others simulate flight, often leaving the user nauseated, since bird-like flight remains an unfamiliar sensation to humans. What is needed is an improved system that allows a system user to experience physical resistance and feedback but does not require the user to wear mechanical devices.

SUMMARY OF THE INVENTION

A VR system can include a VR movement apparatus that includes hand interfaces and foot interfaces that can support the hands and feet of a system user. The VR movement apparatus allow the user's limbs to move in 3-dimensional space and not only along a vertical or horizontal motion plane. Since the user's motion may include vertical (Y direction), lateral (X direction) and/or fore-aft (Z direction) movements, the VR movement apparatus can provide users with simulated real physical activities such as climbing just as they would in a real-world climbing environment.

The VR system can include a VR program that runs on a computer that synchronizes the motion of a user in a VR environment visually through a display and through the VR movement apparatus for a haptic experience. The display can be built into a VR headset, which can include an audio system. The visual signals are coordinated or synchronized with the control signals to the VR movement apparatus so that the visual virtual environment exactly matches with the movement limitations of the hand and feet interfaces of the VR movement apparatus. More specifically, the VR program can display a topographical VR environment that includes virtual objects such as land, mountains, structures, vehicles, etc. The VR software can allow the hand and feet interfaces to move in free space, but can prevent movement through the virtual objects so that the user's movement will stop when virtual contact is made with any virtual structures. These physical objects can be synchronized with the VR visual display so that a user can see and feel the virtual objects, in order to maintain the VR illusion.

In different embodiments, the VR system can be used to simulate various physical activities such as: walking, running, climbing, skating, skiing, snowboarding, driving, cycling, swimming, rowing, windsurfing, water skiing, wake boarding, kite boarding, etc. The VR machine can also provide a means for: training simulations, physical therapy, physical exercise, etc. The VR system can be a safe way to train in simulated environments for hazardous activities such as: rock climbing, skydiving, paragliding, extreme skiing, etc. The inventive VR system can be used in: gyms, health clubs, hotels, and other locations where one might find gym or experience devices.

DETAILED DESCRIPTION

Figure 1:
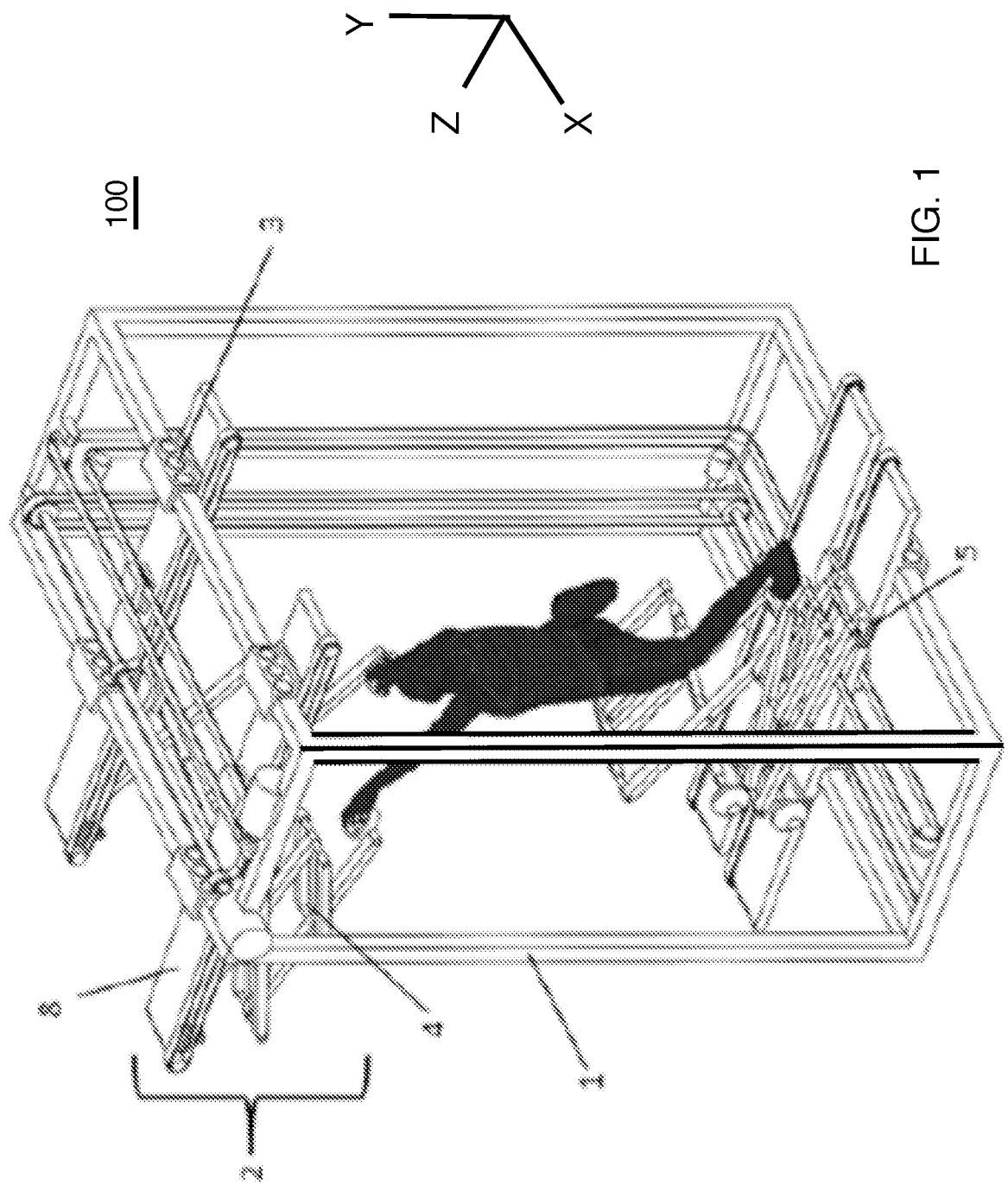
FIG. 1 illustrates a perspective view of an embodiment of a VR movement apparatus with a user.

The present invention is directed towards a VR system that simulates visual and physical interaction with a digital, three-dimensional, VR environment. The inventive VR system can include a headset and a mechanical VR device that can support the user. A computer generated VR three dimensional (3D) environment can be seen by a user through the VR headset and the visual VR environment can be creating a 'haptic robot' movement apparatus that coordinates a physically simulated force felt by the user with the expected physical force that would exist in the VR environment. The result is an experience that deceives both the vision and the physical interaction, as felt by hands and feet and, by extension the user's arms, back, legs, core muscles, etc. By adding the bodily forces, the inventive VR system can create a more complete sensation of VR immersion. The user 'sees' a stereoscopically and spatially feels an accurate facsimile of a VR world about them. As the user interacts within the VR environment, the user would 'feel' a simulated, physical response from such interaction.

For example, in an embodiment a user might choose to virtually climb a structure such as the Eiffel Tower. Visually, they would use the headset to 'see' an accurate facsimile of the Tower, along with Paris in the background, complete with atmospheric haze, clouds, etc. In the foreground, the user would see their digitally created hands moving within their field of vision, reaching to grip a spar, or pulling down as they ascend. The user would be in physical contact with a haptic VR exercise apparatus. Physically, the user's hands and feet would move relative to each other and relative to the virtual environment with the expected physical resistance as seen in the VR headset, as if they were actually climbing upward. In an embodiment, the machine does not provide resistance to upward movement. Gravity can be used to re-center the user as the user ascends so that the system user is moving in place. In a running application, the VR environment can be an incline. The system user can move the legs in a running motion in the VR environment and the VR movement apparatus can re-center the user using gravitational forces so the user is actually running in place. Similarly, if the user is in a mountain climbing VR environment, the VR movement apparatus can re-center the user using gravitational forces so the user is climbing in place.

In other embodiments, a user may use the inventive VR system to virtually experience various other types of activities for play, medical purposes, fantasy, escape, entertainment, fitness, training, etc. Such VR simulations could be designed to for various purposes such as: burning calories, working specific muscle groups, rehabilitating specific areas of focus, developing muscle memory, etc. Since a digital controller drives the entire process, each motion could be stored and analyzed for the effectiveness of the overall routine. This would in turn, offer accurate physical activity compliance monitoring or physical therapy progress information for a patient that can be provided to a doctor. In other embodiments, the inventive VR system can be used for other purposes such as client training monitoring for a coach or personal trainer.

With reference to FIG. 1, an embodiment of a VR exercise apparatus 100 is illustrated which can include a rigid frame 1 that can hold all members of the assembly. In an embodiment, the frame 1 can includes four identical armature assemblies 2 that can be mounted on linear bearings 3 that can slide on the frame 1. The movement of the armature assemblies 2 can be described with reference to an XYZ coordinate system. The linear bearings 3 can allow the armature assemblies 2 to slide laterally in the X direction on the frame 1 with minimal friction. The armature assemblies 2 can include scissor jack mechanisms 4 that are coupled to carriages 8 attached to the linear bearings 3. The carriages 8 can allow the scissor jack mechanisms 4 to move in the Y direction relative to the frame 1. The scissor jack mechanisms 4 can each have a proximal portion that is coupled to the carriages 8 and distal ends which can have user interface mechanisms. The scissor jack mechanisms 4 expand and contract in the Y direction relative to the frame 1. The user can interact with the distal ends of four scissor jack mechanisms 4. The distal ends of the scissor jack mechanisms 4 can be coupled to: a left hand interface, a right hand interface, a left foot interface and a right foot interface which can move to any X, Y, Z position in a 3 dimensional space defined by the frame 1. In an embodiment, the frame 1 can define an X-Y "movement perimeter" and the left hand interface, the right hand interface, the left foot interface and the right foot interface can move within the X-Y movement perimeter. In the illustrated example, the left hand interface, the right hand interface, the left foot interface, the right foot interface and the user 20 may be outside the Z perimeter plane of the frame 1.

Figure 2:
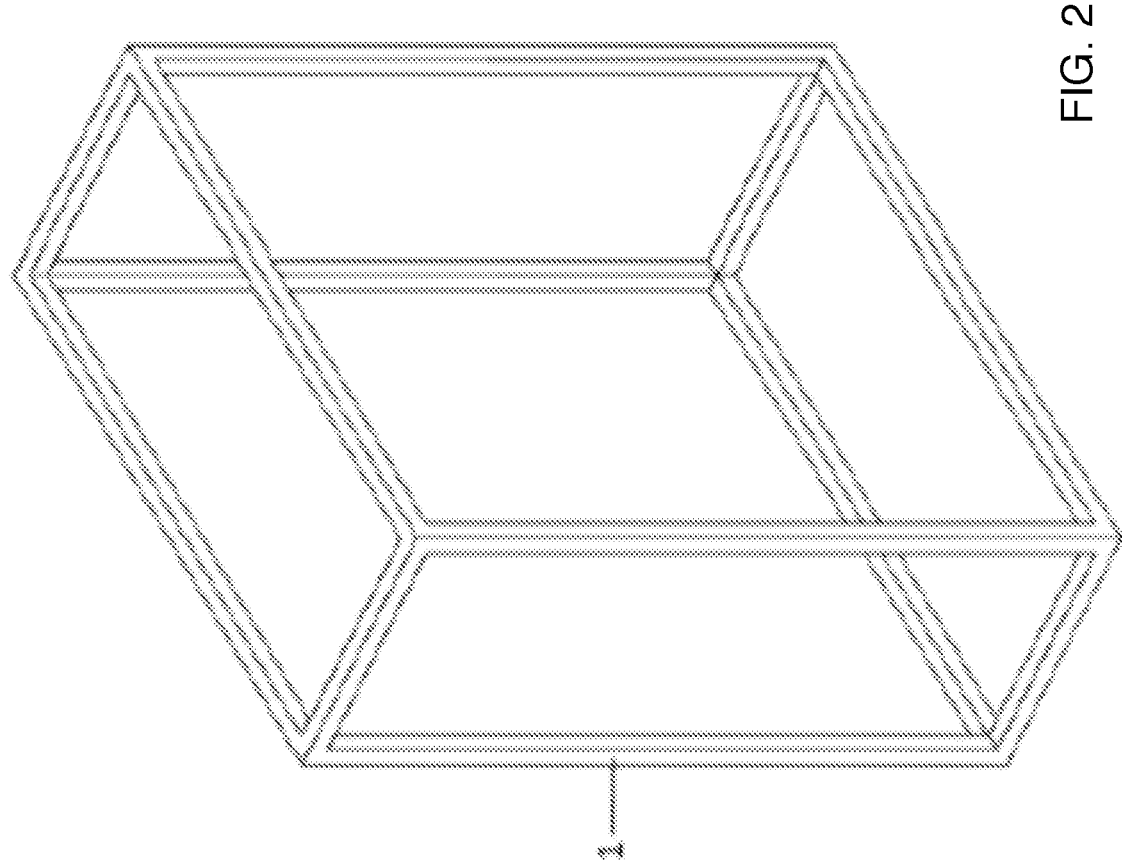
FIG. 2 illustrates a perspective view of an embodiment of a frame of a VR movement apparatus.

With reference to FIG. 2, an embodiment of a rigid frame 1 is illustrated. The frame 1 provides a support structure for the haptic apparatus and can be made of a plurality of straight sections of tubing which can have a uniform cross section such as: square, rectangular, circular, or any other suitable cross section. The tubes can function as tracks for the linear bearings. In another embodiment, the frame 1 may be used as a rigid structure on which linear bearing slides and tracks are mounted. In the illustrated embodiments, frame 1 is a 3D box that has parallel tubes extending the X, Y and Z directions to define a movement space within the apparatus. The linear bearings can slide over the outer surfaces of the tubes. In other embodiments, the tubes may have slots and the linear bearings may slide on inner surfaces of the tubes.

Figure 3:
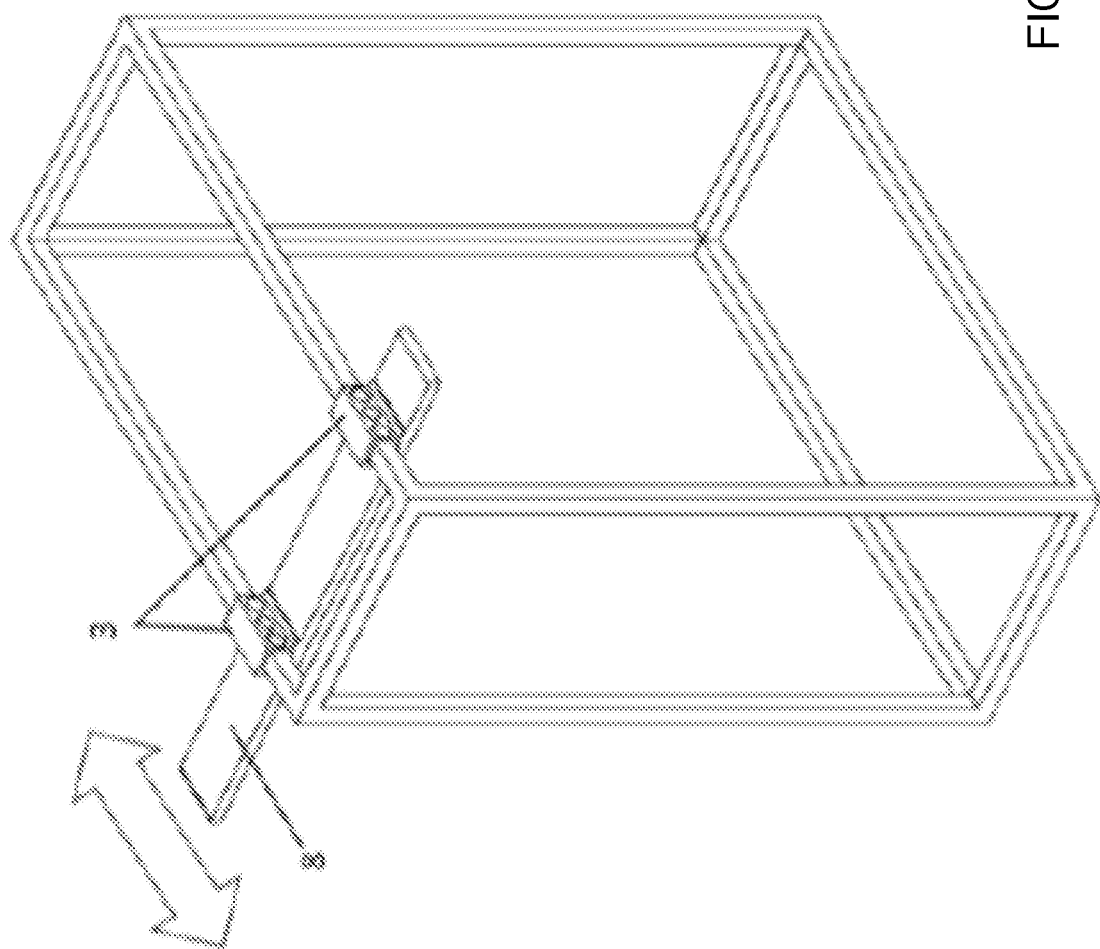
FIG. 3 illustrates a perspective view of an embodiment of a frame and a carriage of a VR movement apparatus.

With reference to FIG. 3, an embodiment of an upper left carriage 8 is coupled to linear bearings 3 which allow the upper left carriage to slide laterally along the upper lateral tracks of the frame 1 with minimal friction. Only one carriage 8 has been shown here for clarity. The linear bearings 3 allow the carriage 8 to move in the X direction.

Figure 4:
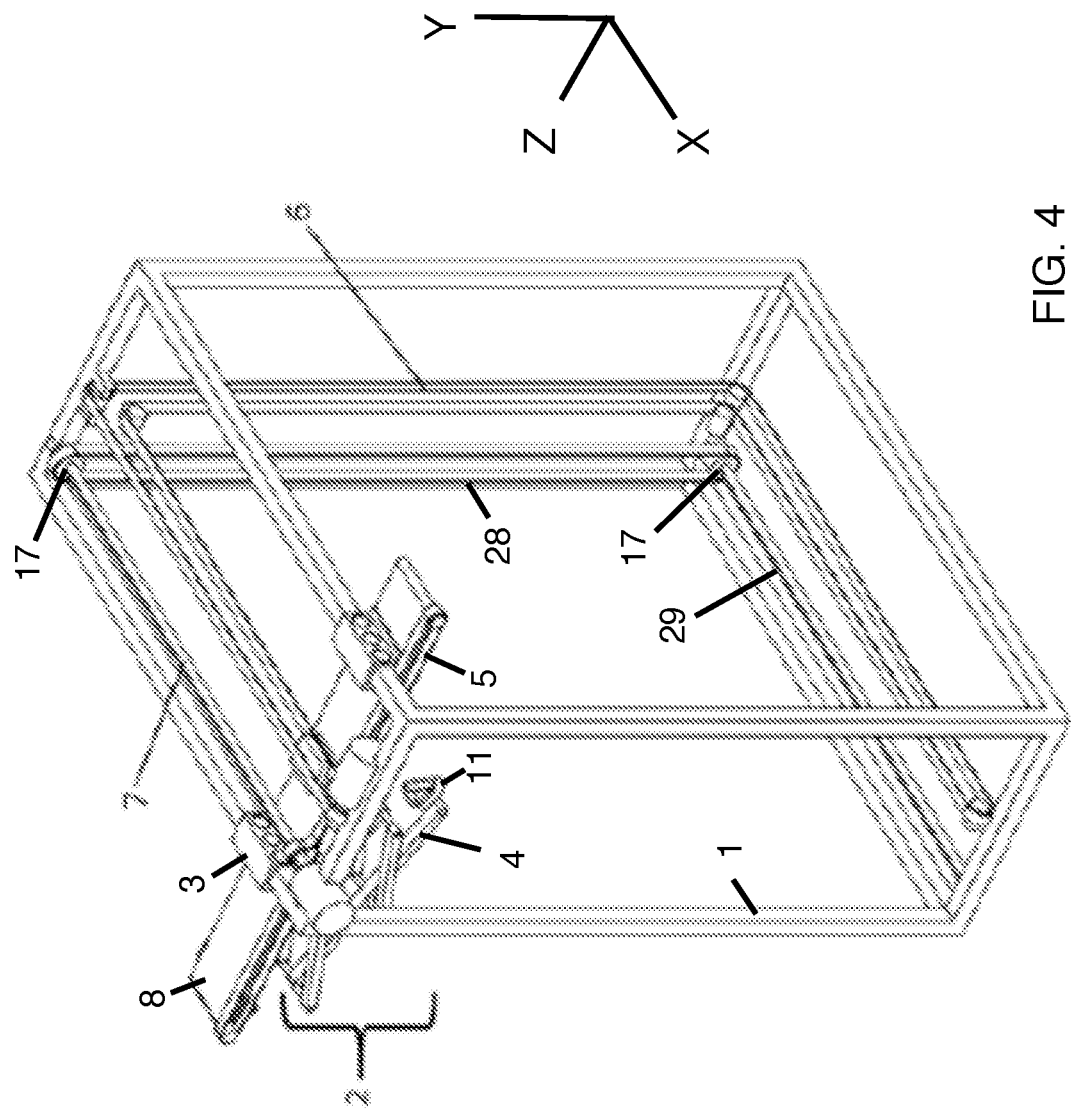
FIGS. 4-6 illustrate perspective views of an embodiment of a frame, carriage and scissor jack mechanism of a VR movement apparatus.

With reference to FIG. 4, an embodiment of a scissor jack mechanism 4 is illustrated with the upper left carriage 8 and the frame 1. The scissor jack mechanism 4 is coupled to the carriage 8 with additional linear bearings that allow the scissor jack mechanism 4 to move in the Z direction relative to the frame 1. The scissor jack mechanism 4 can extend and contract to adjust the vertical position of a distal end. The distal ends of the scissor jack mechanism 4 can include hand or foot connections. Clamp and linear bearing assembly 5 controls fore-aft motion, while the scissor jack mechanism 4 can include a computer controlled brake that regulates the gravity-driven descent of an end effector 11. The computer can monitor the component movement and makes sure that all the end effectors 11 move at the same pace during re-centering movements. When 'vertical motion only' is happening, then the brake 4 is regulating its motion toward the proximal end (for the hands, opposite for the feet). Thus, the scissor jack mechanism 4 can control the vertical Y direction location of the user and the vertical movements of the user. The linear bearings 3, carriage 8 and scissor jack mechanism 4 of the haptic apparatus, link all of the user's three-dimensional motions.

In addition to providing 3D movement, the haptic apparatus, can be configured to prevent or resist movement of the distal ends of the scissor jack mechanisms 2, in order to simulate a haptic 3D VR environment. In the illustrated embodiment, the movement of the carriage 8 and scissor jack mechanism 2 are controlled using a plurality of timing belts 6 and shafts 7 coupled to gears 17 that can control the motion of all moving components in the haptic apparatus.

The timing belts 6 can include teeth that engage the teeth on gears. The downward motion of the linked scissor jack mechanism 2 can result from gravitational pull on the distal ends by a user. This downward movement can be regulated by electric motors or brakes controlled by the microprocessor. Timing belts 5 and spline gears 17 and shafts 7 link all lateral and fore-aft motions of the foot and hand couplings at the distal ends of the scissor jack mechanism 2. This forces the motion vector of all four end effectors to be identical and synchronized. In an embodiment, the four end effectors can be a left hand interface, a right hand interface, a left foot interface and a right foot interface.

Figure 5:
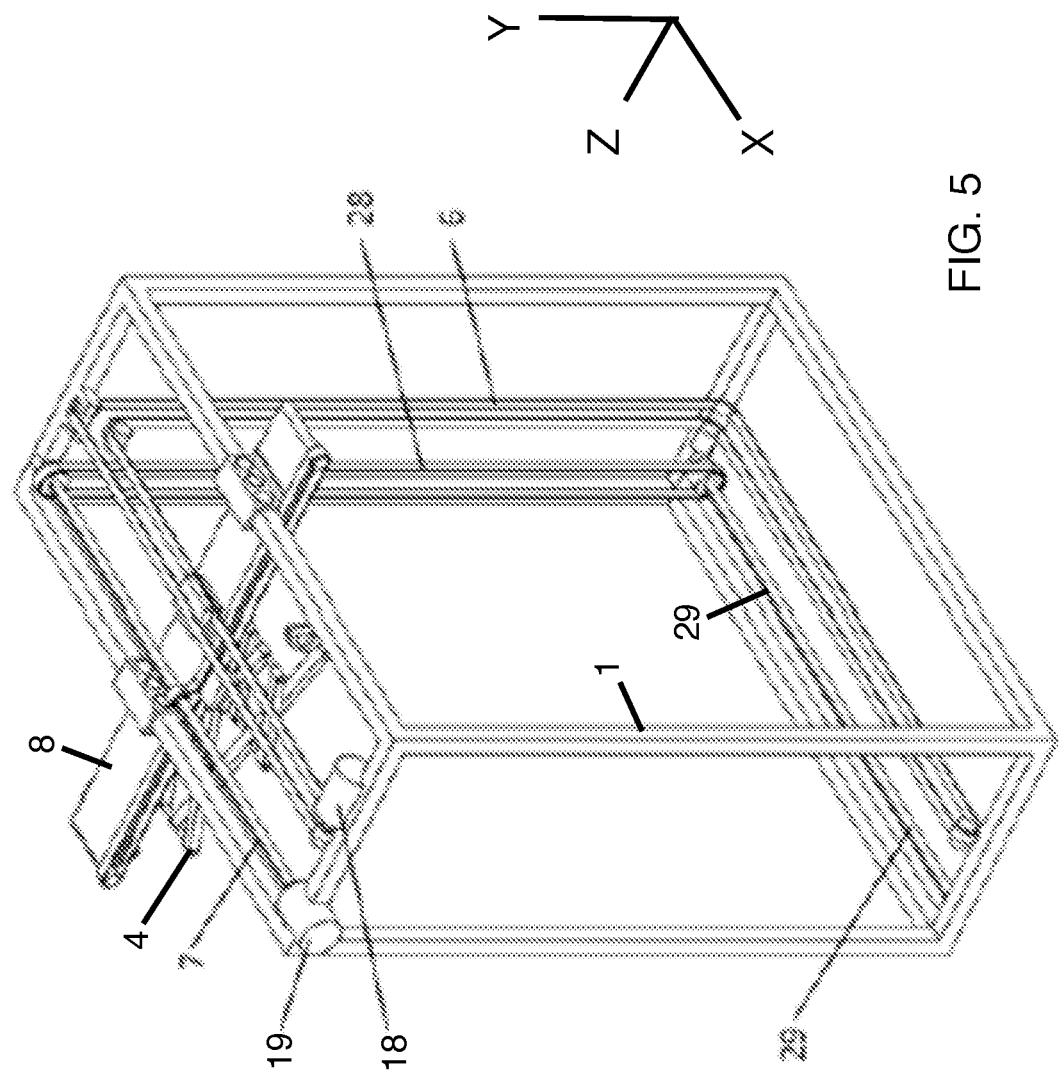

With reference to FIG. 5, the fore-aft motion and lateral motion of the scissor jack mechanisms 4 can be controlled by a fore-aft control motor 19 and a lateral control motor 18, respectively. The lateral control motor 18 can drive a first timing belt 6 that connects all four carriages 8 of the haptic system, when engaged, in a single synchronized motion in the same direction. The fore-aft control motor 19 can be connected to a splined gear 17 which drives a splined shaft 7, which when rotated can move all four scissor jack mechanisms 2 forward simultaneously in the Z direction. When fore-aft control motor 19 rotates in the opposite direction, the reverse movement of the splined gear 17 and splined shaft 7 can moves all four scissor jack mechanisms 2 rearward simultaneously. The splined gear 17 and the shaft 7 at the top of the frame 1 and another shaft 29 at the base of the frame 1 are connected with a timing belt 28, forcing simultaneous motion between the upper and lower scissor jack mechanisms 2.

Figure 6:
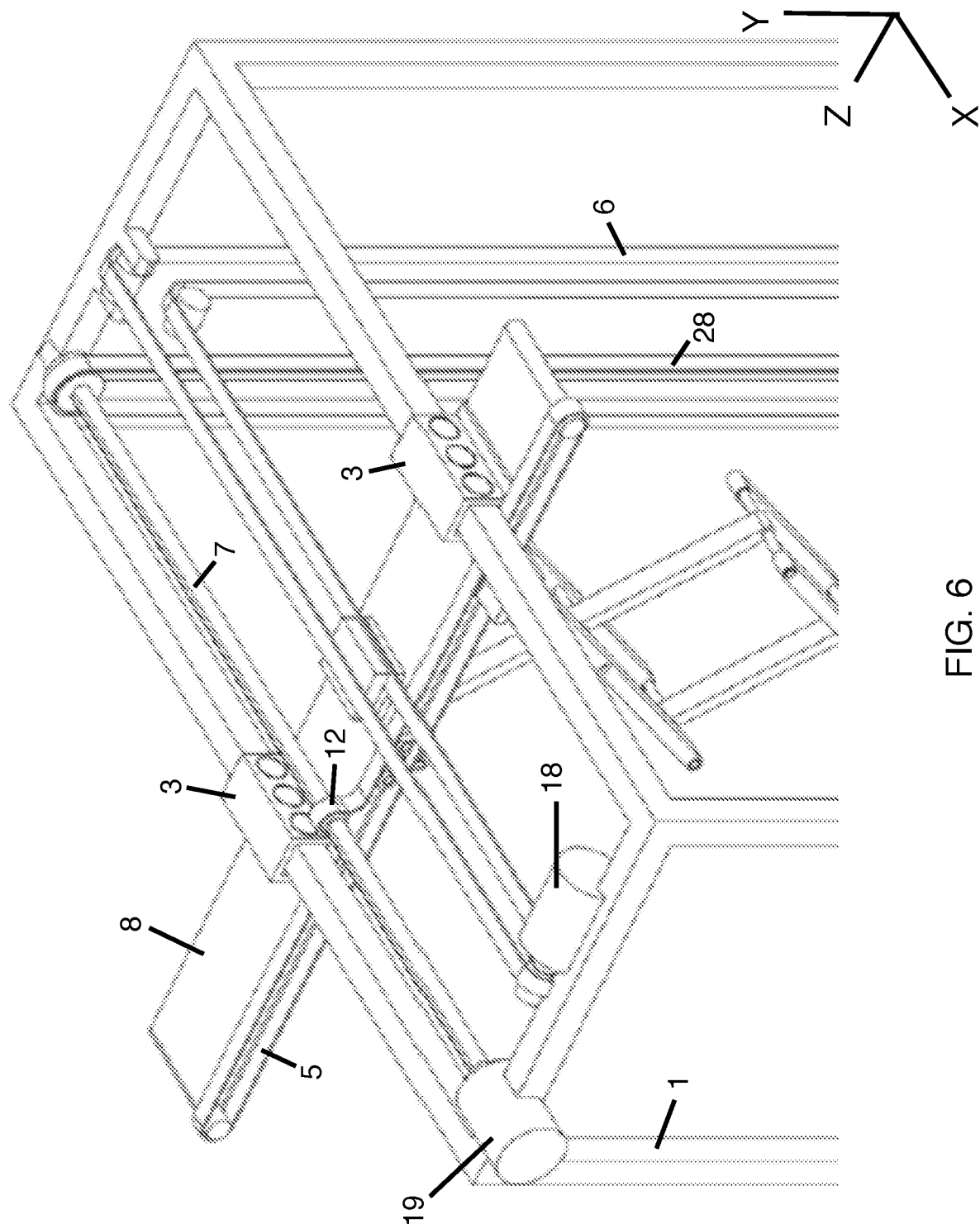

FIG. 6 illustrates a close up perspective view of the haptic apparatus. In this embodiment, the fore-aft control motor 19 can be directly coupled to the splined shaft 7, which extends across the width of the frame 1. The gear 17 is mounted on the opposite end of the splined shaft 7 and a belt 28 surrounds the gear 17 and extends down on the right side of the frame 1 to control the rotation of another splined shaft 29 that extends across the bottom edge width of the frame 1. A sliding shaft gear 12 can be mounted around the splined shaft 7 that can slide along the length and also rotate with the splined shaft 7. The sliding shaft gear 12 is mounted on the carriage 8 and controls the movement of the scissor jack mechanism 4 in the Z direction relative to the carriage 8. The splined shaft 17 can rotate a gear that controls the fore-aft movement of the carriage 8 can also include a belt which controls the fore-aft movement of the scissor jack mechanisms 2 relative to the carriages 8 in the Z direction.

The lateral control motor 18 is coupled to a gear which controls the movements of the belt 6 which extends across the upper width of the frame 1 and then bends extends downward long the right side of the frame 1 and the bottom horizontal surface of the frame 1. The belt 6 the carriages 8 can be coupled to the belt so that movement of the belt in a first direction can cause the carriages 8 move to the right and movement of the belt 6 in the opposite direction can cause the carriages 8 to move of the left relative to the frame 1.

Figure 7:
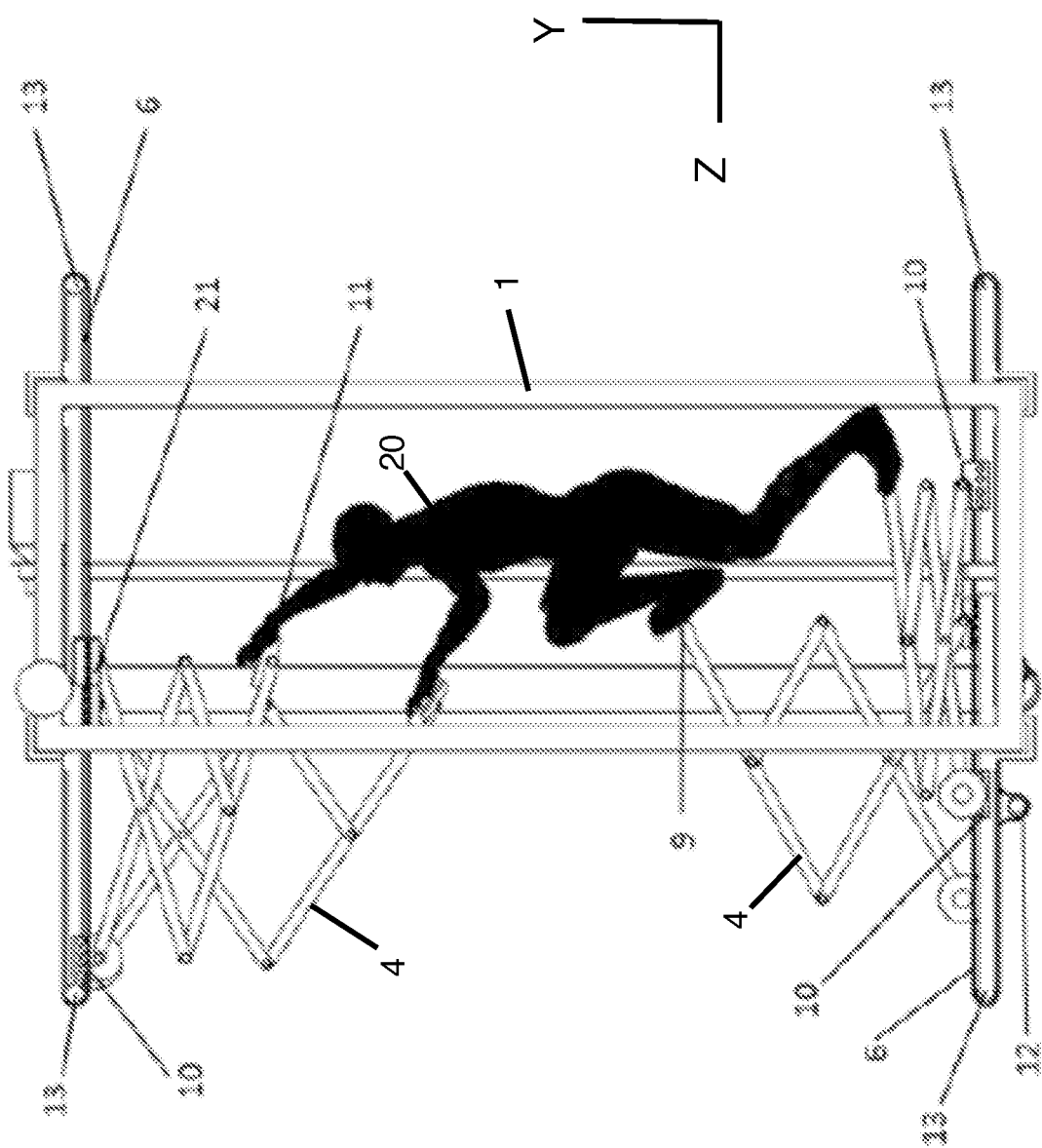
FIG. 7 illustrates a side view of an embodiment of a VR movement apparatus with a user.

FIG. 7 illustrates a left side orthogonal view of an embodiment of the inventive VR movement apparatus. The user 20 holds grips on end effectors 11 with the hands. The end effectors 11 can be a left hand interface and a right hand interface that can be grasped by the user's left and right hands. The user's feet can be affixed to the left foot interface and the right foot interface at the distal ends of the leg scissor jack mechanisms with bindings similar to bicycle bindings or straps across the top of the feet 9. The scissor jack mechanisms slide fore and aft in the Z direction on linear bearings 10.

The bearings 10, carriages and scissor jack mechanisms can move freely when in a 'free motion' state. However, when the user virtually 'grips' a virtual structure through one or both of the end effectors 11, the computer controlled motors and brakes can be actuated to stop further movement to simulate user contact with a VR object. The connected scissor jack mechanism(s) 4 and carriage(s) 2 immediately affix rigidly to their respective specific timing belts 6 by means of a belt-clamps 21 when controlled by the computer to simulate contact with a VR object. At such a VR contact point, some or all of the scissor jack mechanisms 4 can hold the user 20 in a fixed position. If the VR software running on the computer indicates that re-centering is necessary and all of the scissor jack mechanisms 4 can hold the user 20 in a fixed position, the scissor jack mechanisms 4 may move in unison to re-center the user 20 within the movement perimeter of the frame 1. During the re-centering process, the computer can move all of the end effectors 11 in the same relative positions while centering the end effectors 11 within movement perimeter of space as defined by the frame 1.

Each carriage 8 can include is a sliding shaft gear 12 that couples with the fore-aft timing belts 6 mounted to the carriage 8. This sliding shaft gear 12 is keyed to a spline shaft (not shown in this view), allowing all belts to move simultaneously. Freely-spinning Pulleys 13 are mounted to the opposite ends of the carriage 8 so that the fore-aft timing belt 6 forms a tight loop. The movement of the timing belt 6 causes the scissor jack mechanisms 4 to move in the Z direction.

Figure 8:
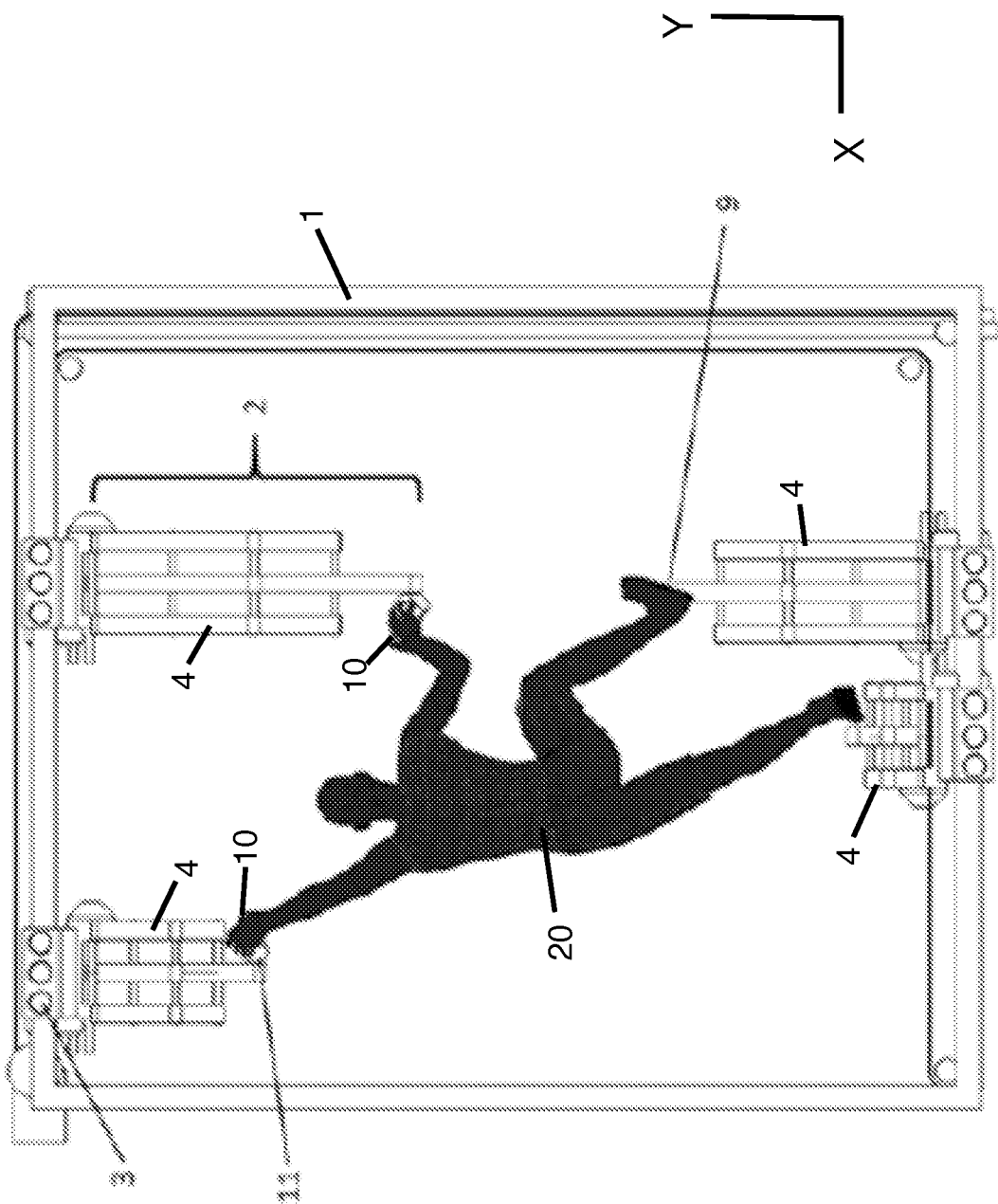
FIG. 8 illustrates a front view of an embodiment of a VR movement apparatus with a user.

FIG. 8 illustrates a rear orthogonal elevation view of an embodiment of the VR apparatus. With the belt-clamps in 'released' states, the four armature assemblies 2 can slide freely in a lateral motion as the linear bearings 3 slide on the frame 1 in the X direction in order to minimize friction. The fore-aft motions (Z direction) and upward-downward (Y direction) motions are similarly free to allow user 20 movement in 'released' state. The user 20 contacts the invention at the end effectors 11 at the hands 10 and feet 9. Since all downward forces are linked using the timing belts and spline shafts, the cumulative downward pressure always can equal the user's total body weight. When the belt-clamps are engaged, some or all of the four scissor jack mechanisms 4 can remain in fixed states, simulating a solid structure to the user's hands and feet. This is reinforced by the visual confirmation of an unmoving structure generated by a computer and seen in the VR headset or other visual display.

When the belt-clamps are engaged and the VR machine needs to re-center the user, all four scissor jack mechanisms 4 can move in X, Y and Z directions—vertical, lateral, fore-aft as needed, in a synchronized motion, in order to return the user 20 to the center of the frame 1 of the machine, preventing the scissor jack mechanisms 4 from moving out of or in contact with a movement perimeter of the VR machine.

Figure 9:
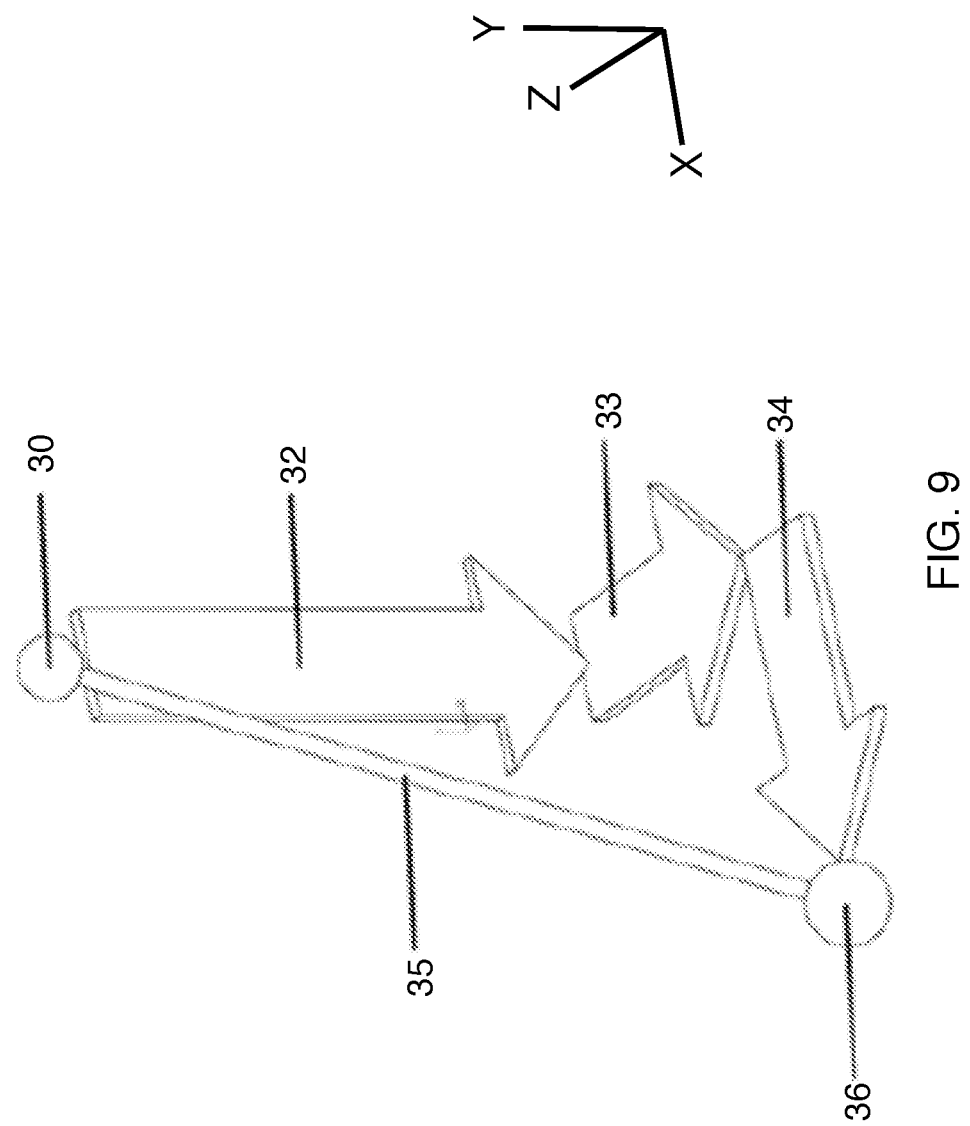
FIG. 9 illustrates an X, Y, and Z direction coordinate force diagram.

With reference to FIG. 9, a plurality of X direction, Y direction and Z direction motion vectors are illustrated. In order to create controlled, deliberate re-centering of the user's body as they 'climb' in place, the scissor jack mechanisms move in a synchronized manner and elongate or contract, move fore and aft, and move laterally. A combination of downward motion 32 and fore-aft motion 33 and lateral motion 34 determines the overall vector 35 of the end effector as it is re-centered from starting location 30 to final position 36. A microprocessor controls the motors and brakes in order to move the end effector along the chosen vector 35.

The velocity of each cartesian vector accelerates and decelerates, in order to minimize the sensation of motion to the user. This velocity may take the form of a spline curve. Since there exist three motions: negative Y movement 32, negative Z movement 33 and positive X movement 14, the top speed may be different for the X movement, Y movement and Z movement, so that they all reach the final position 36 at precisely the same time. In this example, the Y movement 32 is greater than the Z movement 13 or the X movement 34. Therefore, the speed of the Y movement 32 will be greater than the speed of the Z movement 13 or the X movement 34. This assures that the motion from the start location 10 to the finish position 36 feels like a straight line to the user.

Figure 10:
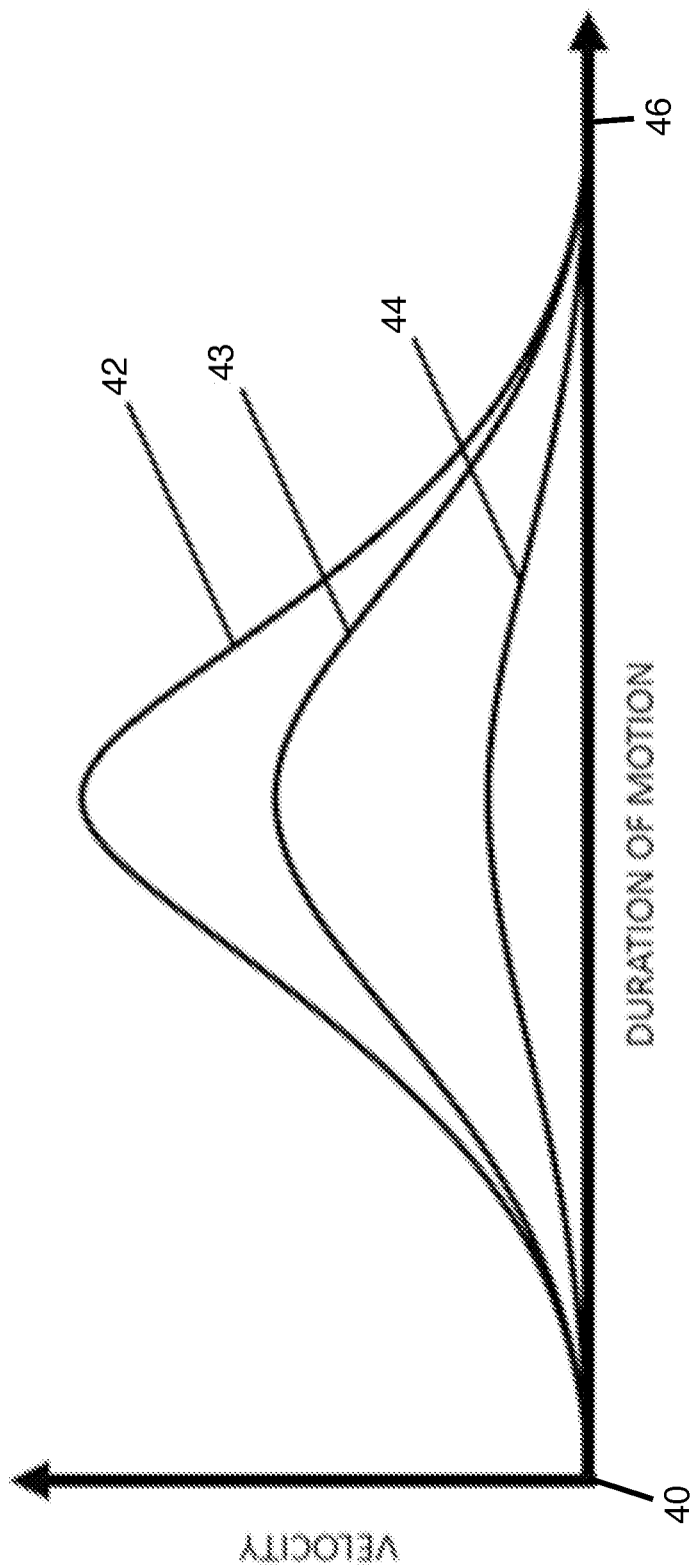
FIG. 10 illustrates an X, Y, and Z direction acceleration graph.

With reference to FIG. 10, a graph illustrating the velocity of the end effector in the X, Y and Z directions over the duration of the motion between the start of the motion 40 at the beginning position and the end of the motion 46 at the final position is illustrated. The X direction velocity 44, Y direction velocity 43 and Z direction velocity 42 all start and finish with very low velocities. However, the X direction velocity 44, Y direction velocity 43 and Z direction velocity 42 all increase to a maximum velocity at the middle of the motion duration and then slow down prior to reaching the end of motion 46 at the final position. Because the motion has a longer vertical travel, the Y velocity 42 is greater than the X velocity 44 or the Z velocity 43. The Z distance and Z velocity 43 is greater than the X distance or X velocity 44. The slow velocities at the starting of the motion 40 and ending of the motion 46 help to minimize the acceleration that can be easily detected so that re-centering is not less detectable by the system user.

Figure 11:
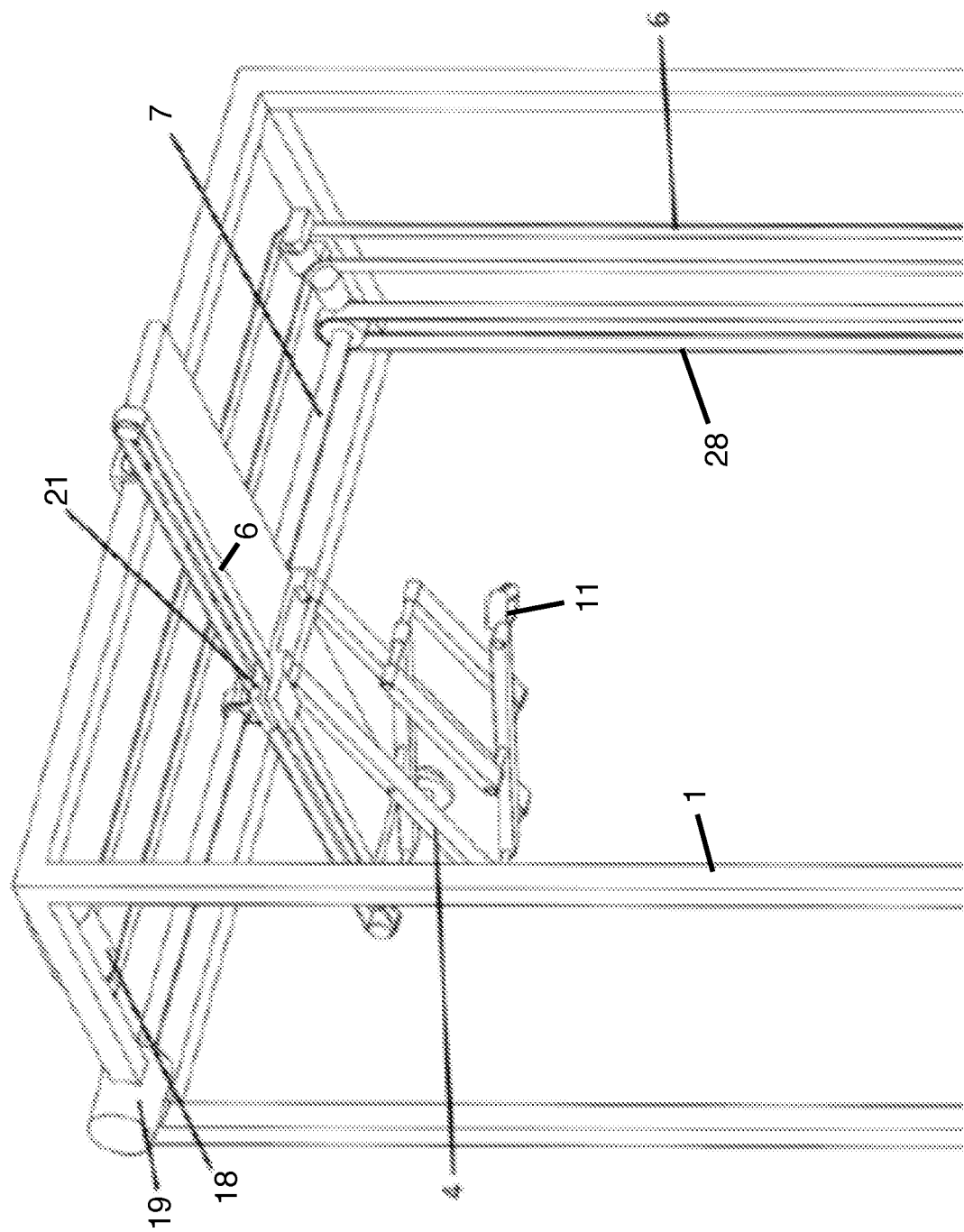
FIGS. 11-14 illustrate perspective views of an embodiment of a VR movement apparatus illustrating movements of the frame, carriage and scissor jack mechanism.

With reference to FIG. 11 a simplified embodiment of a single armature assembly 2 is illustrated in an off centered position. In this embodiment, the armature assembly 2 includes: a scissor jack mechanism 4, belts 6, lateral motion control motor 18, fore-aft motion control motor 19, and a fore-aft belt clamp 21 that is computer controlled. A timing belt 6 can be connected to the upper spline shaft 7 with the lower splined shaft (not shown), in order to connect all fore-aft motion into synchronicity. When the fore-aft motion control motor 19 rotates the splined shafts 7, the sliding gears 17 can rotate and move fore-aft belt along the carriage 8. The scissor jack mechanisms 4 can move in the Z direction relative to the carriage 8 and frame 1. When the motor 18 rotates, the carriage 8 and scissor jack mechanisms 4 can move in the X direction relative to the frame 1. The scissor jack mechanism 4 has two proximal ends, which are coupled to the fore-aft timing belt 5. When the clamp 21 is released, the distal end effector 11 can move freely vertically in the Y direction and then the clamp 21 is actuated, the end effector 11 can be locked in place preventing movement in the Y direction.

Figure 12:
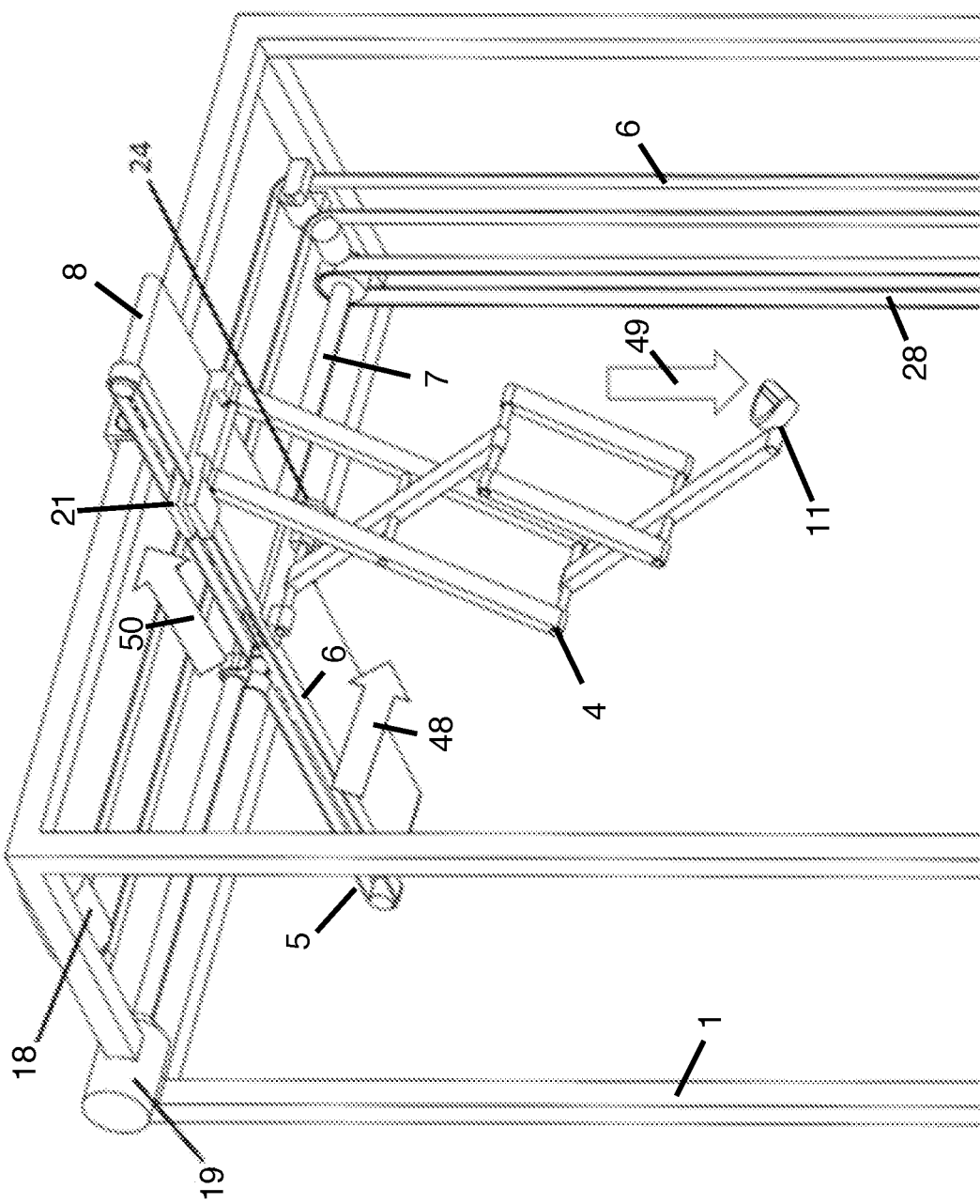

With reference to FIG. 12, a simplified embodiment of a single armature assembly 2 is illustrated moving from an off centered position to a centered position. When re-centering the user's lowest foot once the software has 'decided' the correct motion vector, the lateral motion control motor 18 and the fore-aft motion control motor 19 relocate the end effector along the horizontal motion plane. Simultaneously, the descent motion controller 24 regulates the downward motion of the end effector 11. In one embodiment, the descent motion controller 24 is an electric motor. In another embodiment, the descent motion controller 24 is a mechanical brake, able to regulate motion by creating specified resistance. All motions are designed to move the end effector 11 along the chosen vector so that their start and stop times are synchronous, regardless of distance. The clamp 21 can be modulated to control the vertical movement rate of the end effector 11. In the illustrated example, the re-centering movement of the end effector 11 (from the position illustrated in FIG. 11) includes the following movements: negative X direction 48, negative Y direction 49 and negative Z direction 50. In doing so, the three-dimensional vectors will follow a straight path and variable velocity pattern as discussed above with reference to FIGS. 9 and 10.

Figure 13:
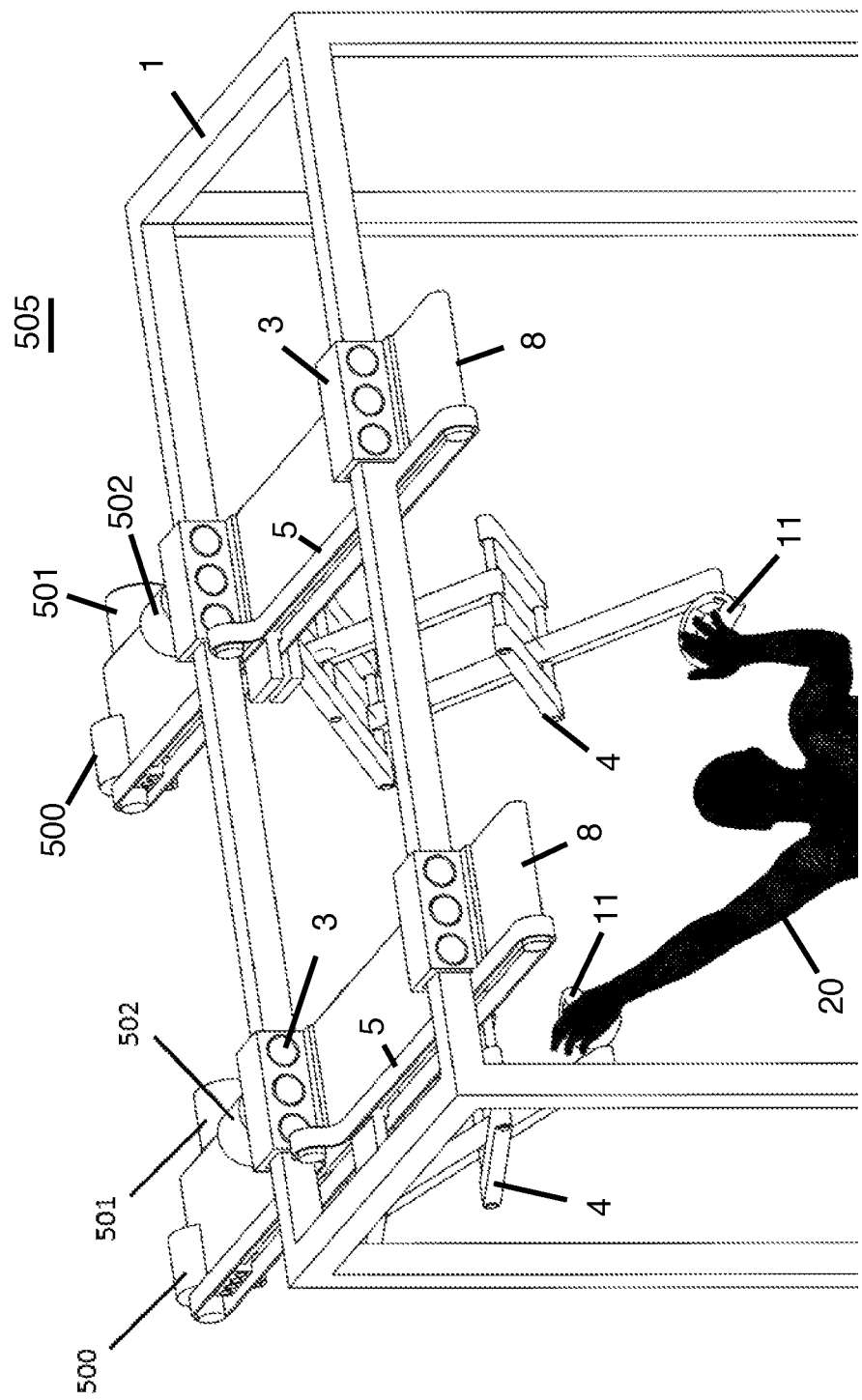
Figure 14:
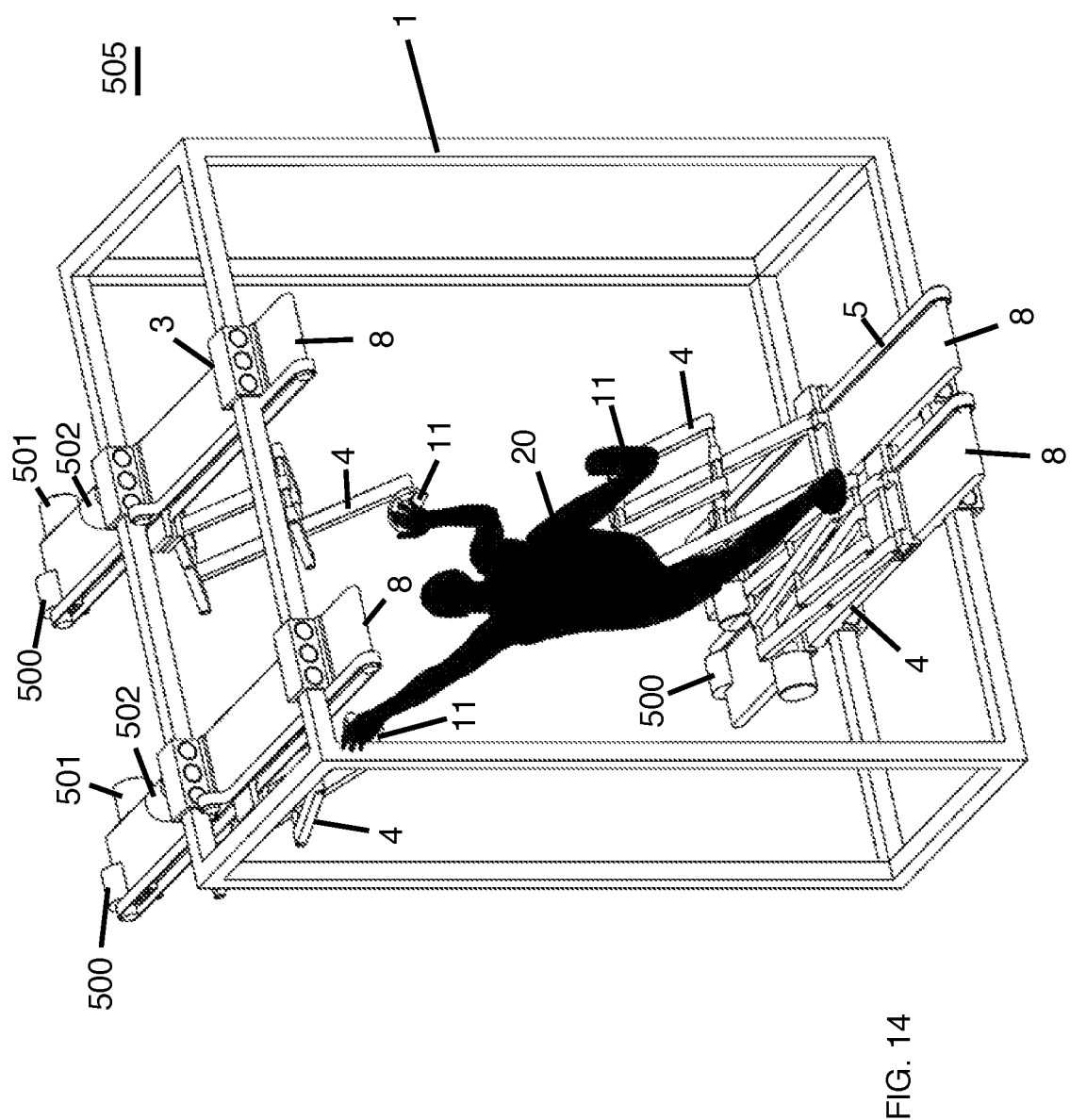

In FIGS. 1-12 an embodiment of a VR movement apparatus was illustrated that used belts, gears and shafts to perform the re-centering movement of the end effectors 11. In other embodiments, other mechanisms can be used to control and restrict the movement of the end effectors 11. In an embodiment with reference to FIGS. 13 and 14, motors 500, 501, 502 can be used to with the VR movement apparatus 505. FIG. 13 illustrates a perspective view of a top portion of a VR movement apparatus 505 and FIG. 14 illustrates a perspective of an entire VR movement apparatus 505. In this embodiment, the vertical motion of the end effector 11 can be controlled by a vertical control motor 500, the fore-aft motion of the end effector 11 can be controlled by a for-aft motor 501 and the lateral movement of the end effector 11 can be control by a lateral motor 502. The motors 500, 501, 502 can be controlled by a computer processor that allows free movement of the end effector 11 in virtual free space and prevents movement of the end effectors 11 through any virtual solid objects. In an embodiment, the motors 500, 501, 502 can be stepper motors that can also provide location information for the end effectors 11 in the X, Y and Z directions. The motors can be energized to resist rotation and movement of the end effectors 11 when the end effectors 11 are determined to be in contact with a surface of a VR object.

Figure 15:
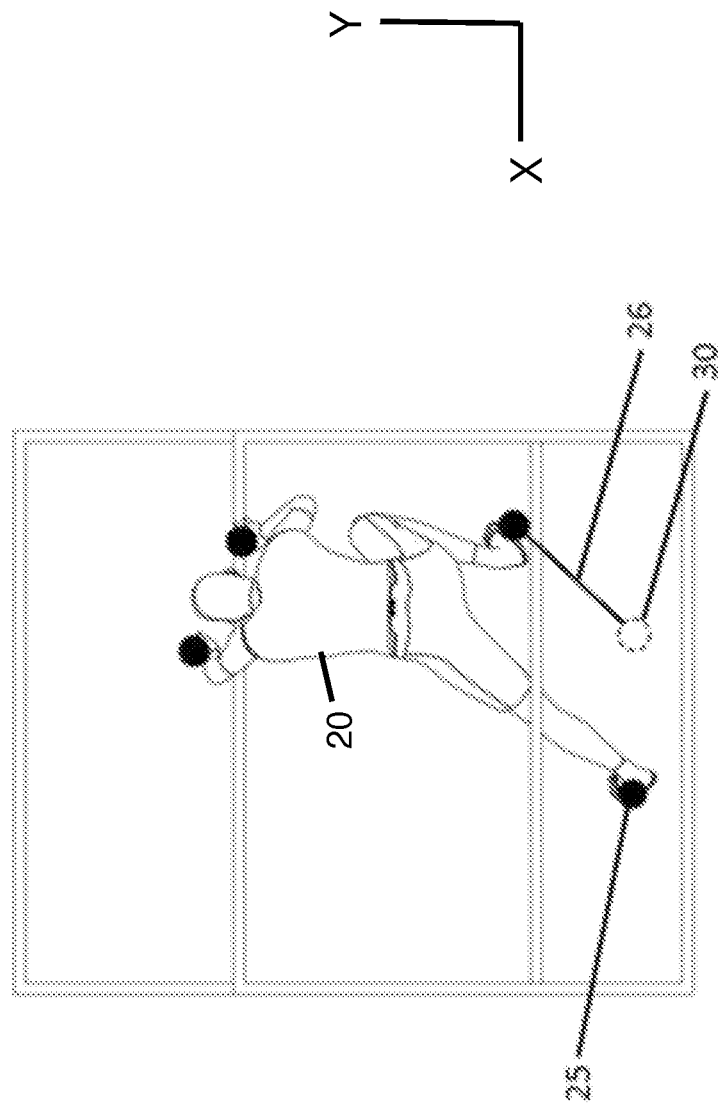
FIGS. 15-17 illustrate front views of a user's movements on an embodiment on a VR movement apparatus.

FIG. 15 shows a front view of a user 20 operating the VR apparatus and illustrates a first step in a user motion cycle. In this case, the user's hands and feet are confirmed on virtual grip points. The machine remains static, since the user's lowest foot is fixed in its neutral starting state 25. In the illustrated embodiment, the left foot end effector determines the lowest point of the user's body. The machine has calculated the motion vector 26 between the right foot end effector and its neutral starting state 30. No re-centering motion can take place until the end effector for the lowest foot lifts, indicating that an ascent motion is taking place. This movement of the lowest foot end effector can trigger the described re-centering motion.

Figure 16:
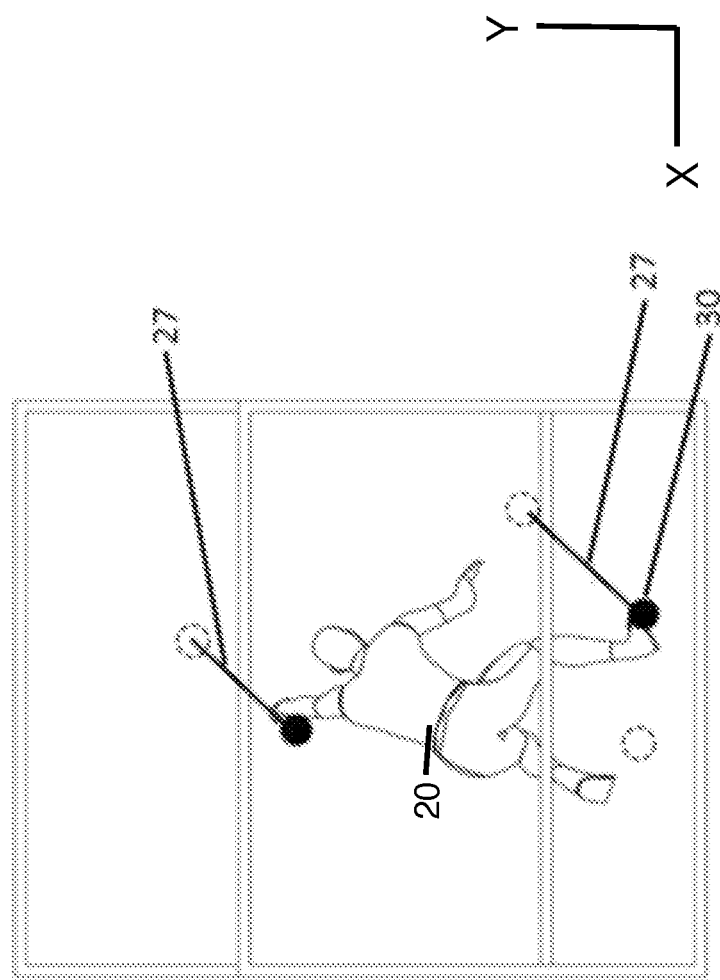

With reference to FIG. 16, the user 20 has released their confirmed grip from their left foot and right hand. The left foot has lifted from its confirmed grip point, initiating the machine's re-centering motion. The remaining, fixed end effectors, the right foot and left hand re-center according to a vector 27 required to relocate the new lowest foot to the neutral starting state 30, in preparation for the next motion of the user. With the user and end effectors now centered, the user has free range of motion in all directions. Although this diagram shows the motion in two dimensions, the motion will include the Z-direction (fore-aft) motion, which allows the user to move in all upward directions before they are automatically re-centered.

Figure 17:
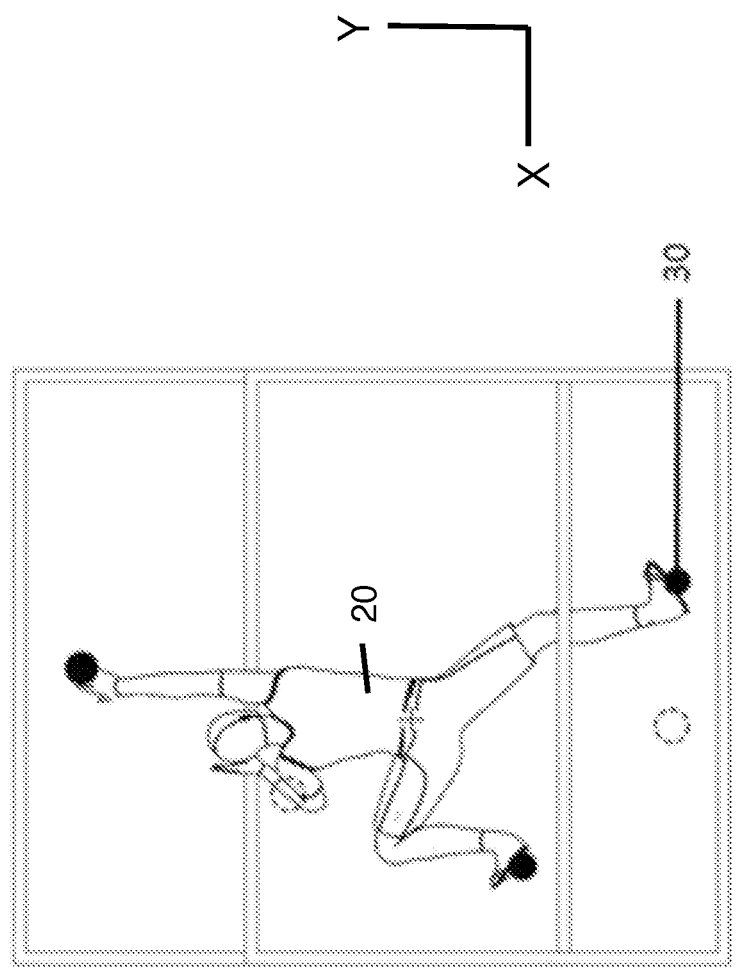

With reference to FIG. 17, the user has chosen a new, fixed position for the left foot, while the right foot remains in its neutral starting state 30. At the moment the user lifts their lowest foot, a new re-centering vector is calculated between the foot that will become the new, lowest foot and its neutral starting state 30, and the re-centering process repeats.

The inventive system can coordinate visual and haptic data that is provided to the user through a VR headset and the described haptic apparatus. In the haptic apparatus, each Cartesian motion vector (X, Y and Z) is defined by a linear bearing direction. The hardware components associated with each direction can be connected to a timing belt. Though these connections the movement of the timing belts can be activated or released as needed by commands from a microprocessor. The flat horizontal plane of motion (X and Z direction) can be controlled by electric motors. The Y direction (the vertical) movements can be controlled by an electronically computer controlled brake. In other embodiments, the Y direction can be controlled by an electric motor or any other suitable control device can be used.

Thus, when the haptic apparatus user is free to move their hand or foot unencumbered, provided that the space of the sensor embedded within the grip or foot binding remains outside the 3D, digital environment. In this way, their motion emulates the 'real world' environment, where a user is free to move hands and feet, provided they do not intersect with solid objects. If the user positions their hand or foot and therefore the positional sensor within that component within the range of an element that is designated as a 'hold' or 'grabable entity', then the mechanical components which had been moving freely now clamp firmly onto their timing belts, thereby locking them into fixed state, as if they had grabbed or otherwise intersected a solid mass. As long as downward pressure is applied to that grip, the clamps remain engaged to the timing belt. If the user lifts the hand or foot above that 'hold', then just as in the 'real world', the grip is released, the timing belts are disengaged, and the user is again free to move their hand or foot unencumbered.

The role of the software is to detect the relationship between the hand and foot interfaces and the VR surface that the user virtually interacts with. If, for example, the user 'punches' the virtual, solid mass, then the timing belt clamps engage immediately upon the virtual impact. The system can calculate timing and physical impact of intersection between the hand sensor and the virtual solid mass. As long as the hand sensor remains in such position, the hand will remain in locked state preventing further movement. If the user withdraws their hand after impact, then this motion away from a virtual object is detected, and the timing belt clamps disengage, releasing the hand back to free motion. The user can wear a VR headset with a visual display that projects a VR environment. The 3D VR environment space can be coordinated by the computer to allow the user to move in an open world VR environment while being physically confined within the frame of the VR apparatus.

In some embodiments, the VR system can use interpret specific actions of the user to transition between simulated physical contact with a virtual object and non-contact. For example, in order to 'release' a grip, the user may simply lift their hand or foot, as they would in a real-world climbing environment to move the corresponding hand or foot interface away from the virtual object and into virtual free space. This movement by the user can provide signals to the microprocessor that the user intends to disengage that particular grip, at which time the machine releases all restrictions to motion for that limb through the VR movement apparatus controls.

Figure 18:
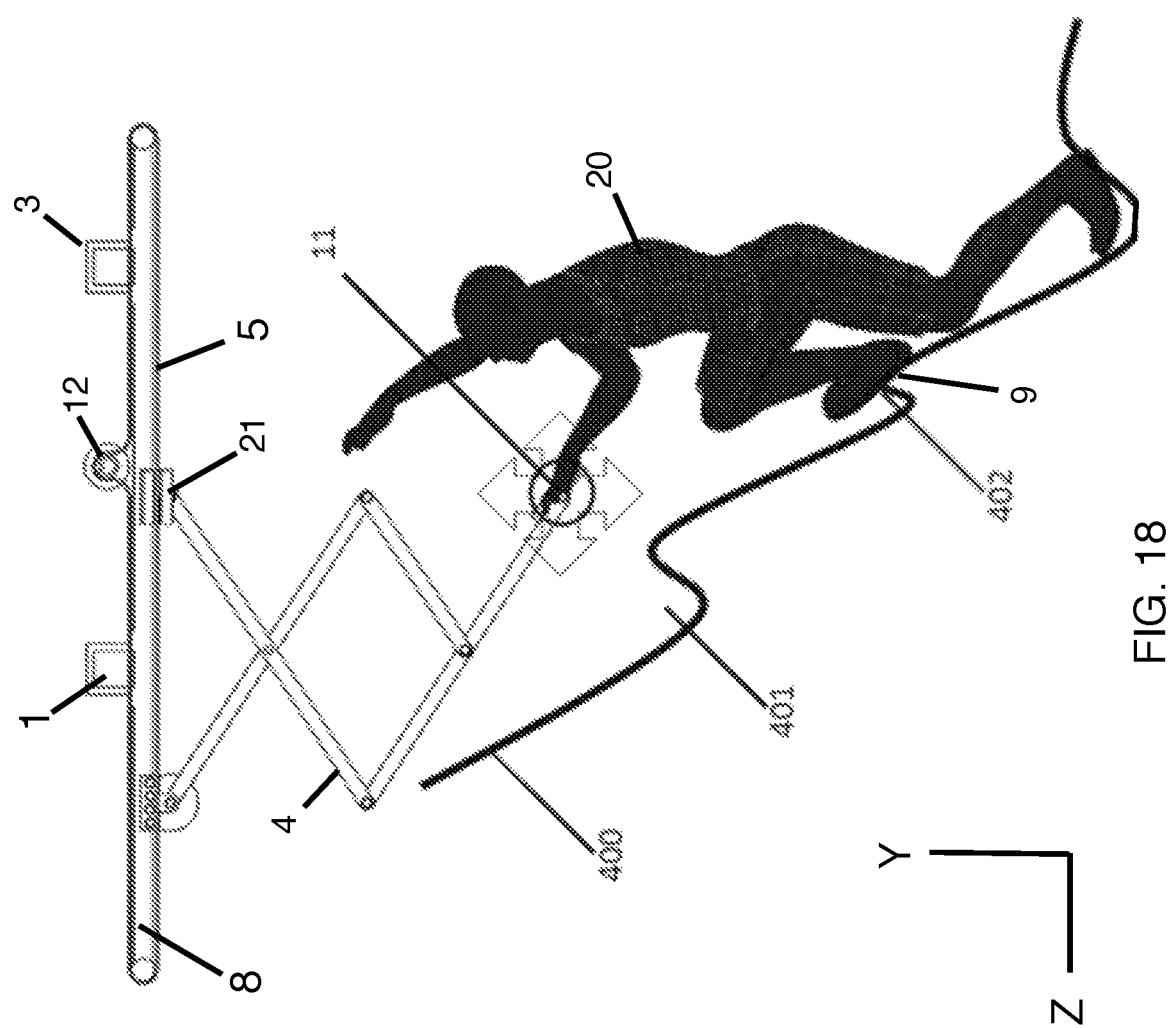
FIGS. 18-20 illustrate side views of a user on an embodiment on a VR movement apparatus with a VR terrain.

FIG. 18 shows a side view of a virtual surface 400 that a user 20 virtually interacts with. The VR software can designate a plurality of points a three dimensional space within this virtual environment as 'solid' surface or a 'not solid' open space. When the user moves the end effectors 11 in 'not solid' space, the user's hands or feet can move unencumbered in all directions. When the user moves the end effectors 11 into a 'solid' surface, the user's hands or feet can move be virtually stopped in the direction of the virtual surface. In this example, the user's foot end effector 9 intersects with a protrusion in the virtual terrain 402. This feels solid to the user, since the VR software has determined that the end effector 9 rests on a legitimately solid VR surface, a virtual protrusion in the virtual terrain 402. Therefore, the VR software has restricted motion of the foot end effector 9 in the downward direction of the virtual terrain 402 relative to the end effector 9 to simulate a foothold on the virtual terrain 402. The VR software may allow the foot end effector 9 in an upward or rearward direction relative to the virtual terrain 402. However, the user's hand end effectors 11 are in not solid open space and therefore they are free to move unrestricted in any direction within the virtual open space.

Figure 19:
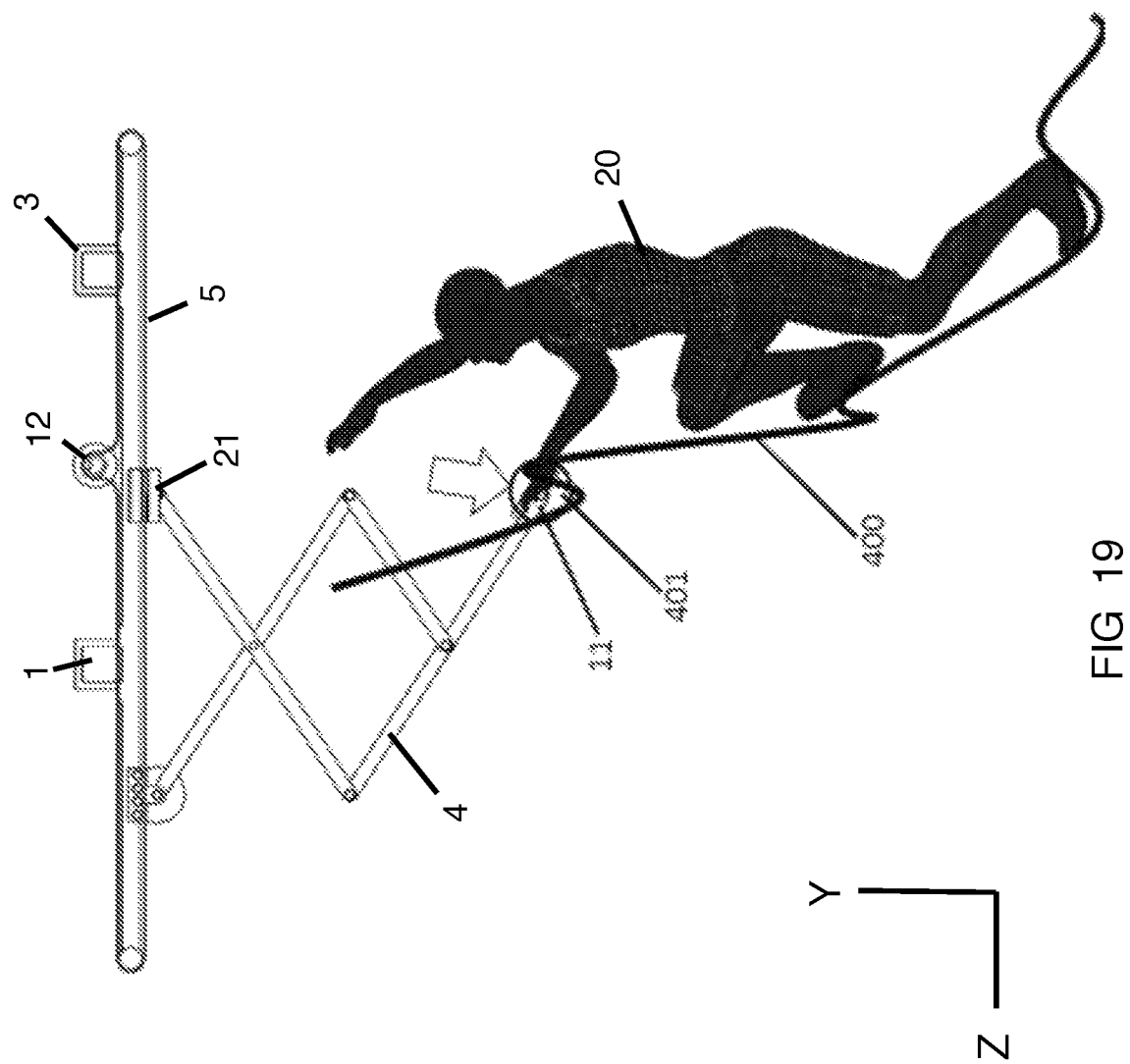

With reference to FIG. 19, the user may choose to locate their hand and end effector 11 into a protrusion 401, in order to climb higher in the virtual terrain 400. The user 20 has virtually grabbed a virtual protrusion 401 in the virtual terrain 400 with a hand. The hand end effector 11 has intersected with a legitimate virtual protrusion 401 feature and performed a grabbing movement. The VR software has determined that the position of the end effector 11 is on the virtual protrusion 401. The VR software can respond to this virtual contact by restricting the movement of the end effector 11 in the downward direction of the virtual terrain 402 relative to the end effector 9. The VR software may also restrict the hand end effector 9 movements in the X and Z directions to simulate a handgrip on the virtual protrusion 401. However, the VR software may not restrict the movement of the hand end effector 9 in a vertical Y direction away from the virtual protrusion 401. Thus, the end effector 9 will no longer have complete free motion, which can provide a solid haptic feel to the user 20 to simulate a handhold of the virtual terrain 402.

Figure 20:
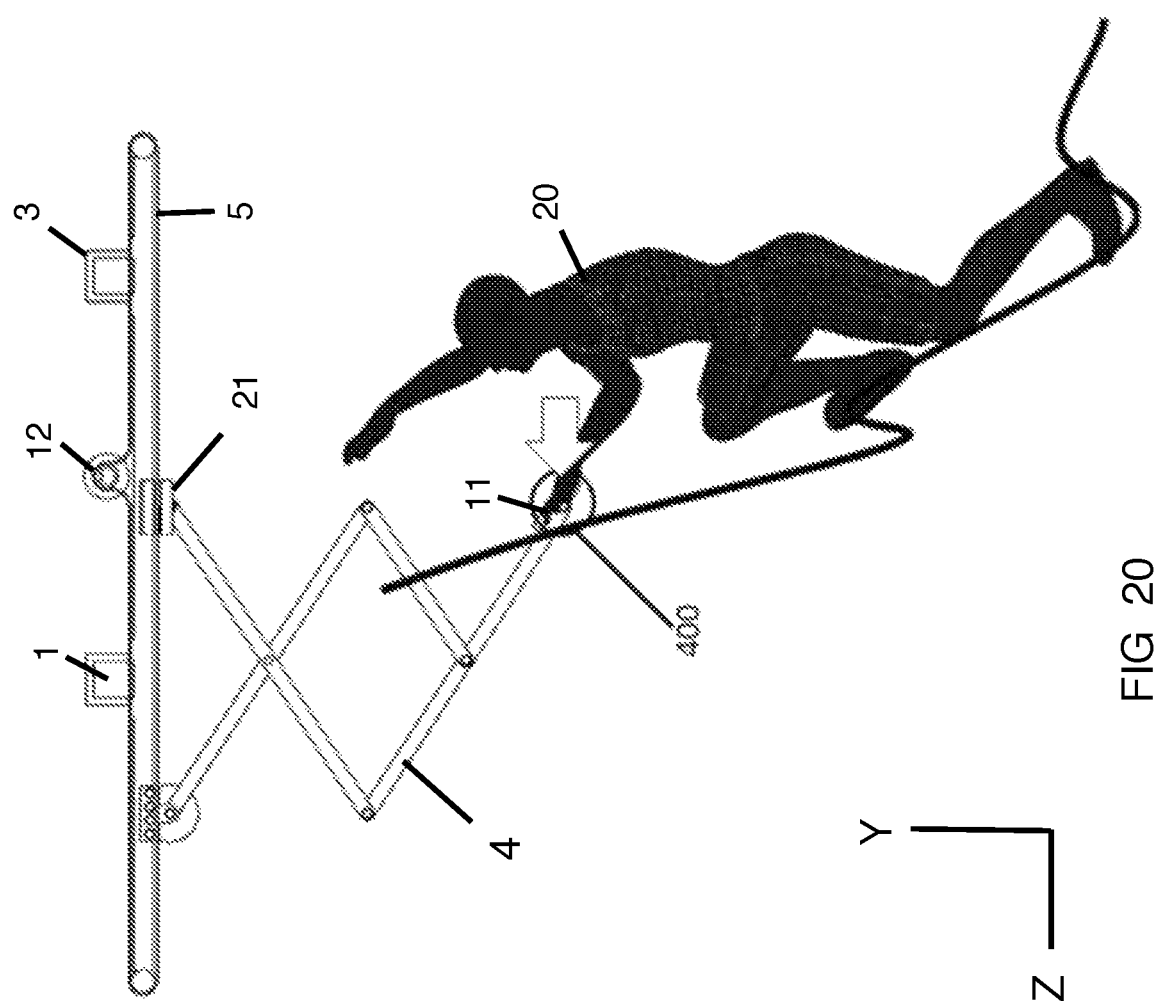

With reference to FIG. 20, a side view of a user 20 on the movement apparatus is illustrated. The user 20 is pushing against a virtual surface 400 that has no features for grabbing. In this case, the VR software has determined that the user's hand end effector 11 intersects with the virtual surface 400, and so it restricts continued motion along that vector in the Z direction into the virtual surface 400. However, the VR software but may not restrict the movement of the hand end effector 11 in the X or Y directions because the virtual surface 400 would not restrict the movement of the hand end effector 11 in these directions. In an embodiment, force sensors can determine that the user continues to push in the Z direction towards the virtual surface 400, and the VR software can continue to restrict this continued motion into the virtual solid surface 400. If the user chooses to withdraw their hand and hand end effector 11 from the virtual surface 400 in a negative Z direction, the VR software will sense motion in the opposite direction, and will immediately allow unencumbered motion in all directions to simulate the free hand movement in open space.

In an embodiment, the VR software can simulate a friction force of a virtual hand against a virtual surface 400. While the movement in the Z direction can be restricted by the virtual surface, movement of the end effector 11 in the X and Y directions can be restricted by a simulated friction force which can be represented by the equation, Friction Force≤(coefficient of friction)×Normal Force. If the coefficient of friction is 0.5 and the normal force is the Z direction force of 20 pounds, then the Friction Force≤10 pounds. This means that if the user exerts a force of less than 10 pounds in the X or Y directions, the end effector will not move because this X or Y direction force is less than 10 pounds. In contrast if the user exerts a force more than 10 pounds in the X or Y directions the end effector 11 will move in the direction of the force in the X or Y directions. The coefficient of friction can be variable and can depend upon the material of the virtual surface 400. A virtual surface 400 that is a slippery material such as ice will have a lower coefficient of friction than a high grip surface such as a rubber track. In an embodiment, the VR system can store multiple virtual surface 400 materials and different coefficients of friction for the different materials. The end effectors 11 can have force transducers, which measure the forces applied by the user 20 and the computer can use the coefficient of friction to calculate the friction forces to apply to the contact of the end effectors 11 with the virtual surfaces 400.

Figure 21:
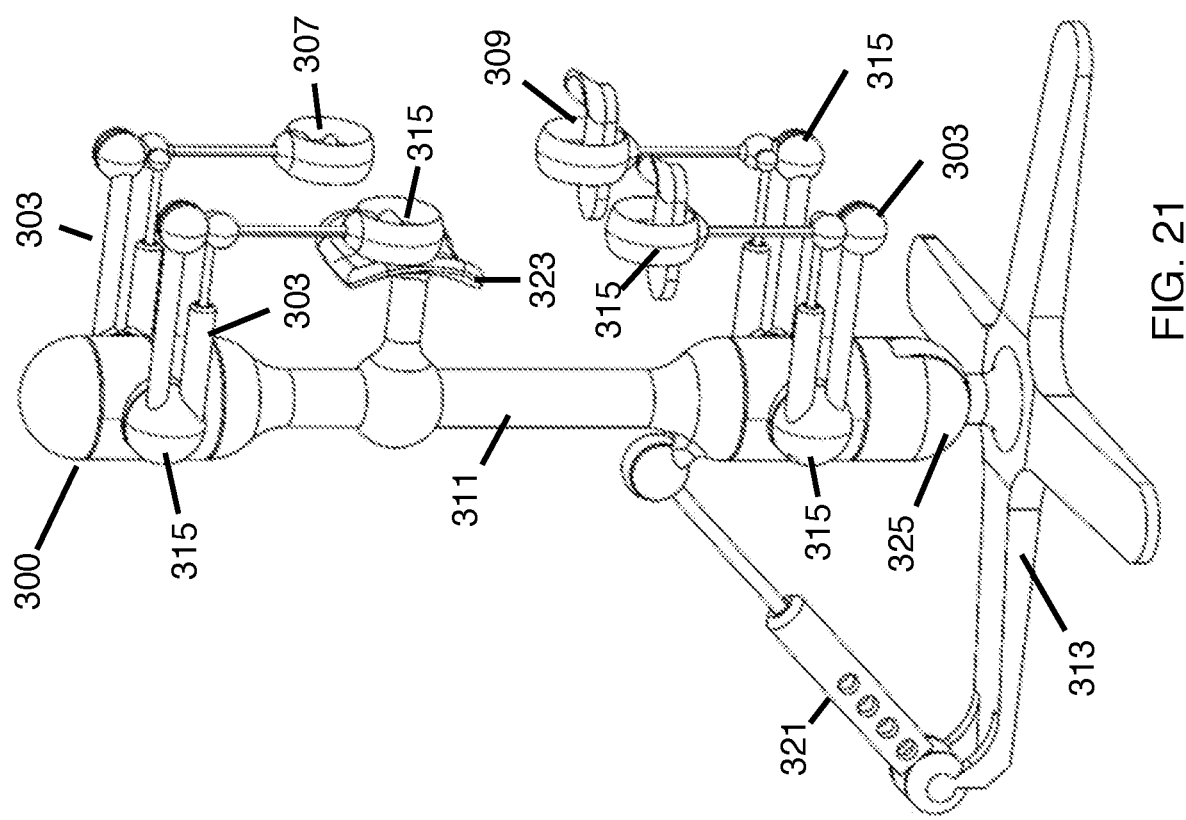
FIG. 21 illustrates perspective view of an embodiment of a VR movement apparatus.

While the present invention has been described with reference to VR movement apparatus that have a frame 1 which defines a movement perimeter and is described above with reference to FIGS. 1-17, in other embodiments, other VR movement apparatus can be used with the inventive system. For example, in an embodiment with reference to FIG. 21, the VR movement apparatus 300 can take the shape of a large robot that can be approximately 10 feet high with four articulated arms 303, each comprising three rotational joints at the X, Y and Z axes. Gimbal grips 307 for the hands, or foot bindings 309 on gimbals to hold the feet can be mounted to the distal ends of the arms 303. Similar gimbal grips 307 and foot bindings 309 can be used with the VR movement apparatus described above with reference to FIGS. 1-17.

To use the VR movement apparatus 300, the user steps into the foot bindings 309, and grips the hand gimbal grips 307. The user can also wear a virtual reality headset that can include a visual display and headphones placed into or over the ears to minimize outside sound and to create stereophonic, three-dimensional sound to further augment the experience.

The appearance of the VR movement apparatus 300 may comprise a central core 311 which can possibly be a cylindrical shaft that may be approximately 6 feet in length and 1 foot in diameter. The arms 303 can rotate about the central core 311, extending toward the user. The central core 311 can include another pivot 325 at the base 313, allowing the central core 311 to tilt rearward into 'prone' position by the movement of a tilt actuator 321, if the user chooses a virtual experience that is improved by lying prone (flying, swimming, etc.). In this case, a pad 323 would rest against the user's abdomen/chest (like a massage table) to steady the body, in order to isolate motion of the limbs.

The foot bindings 309 and the hand gimbal grips 307 allow the foot and hand to rotate around their ankle and wrist respectively, so that, although the hand and foot may rotate naturally, the force is translated back into the armature and overall motion. In an embodiment, the robotic arms 303 can include a motor driving each joint of the arms 303. There can be three joints 315 for each of the four arms 303 for a total of twelve joints 315. The total range of motion of each of the robotic arms 303 covers most or all of the range of motion of the corresponding human limb, allowing the user full range of motion while interacting with the VR movement apparatus 300. The motors can be integrated with the central core 311 of the VR movement apparatus 300, and coupled to the distal ends of the robotic arms 303 by drive shafts, belts or chain drives, thereby de-weighting the arm, thereby reducing the inertia caused by the arm's structure.

In an embodiment, the VR movement apparatus 300 can also include position sensors at each joint 315, thereby giving positional feedback to the CPU for each motion and location. Force sensors may also exist at each joint 315, enabling accurate control of the amount of force that can be applied to each motion path. These also accumulate data on the total amount of force given by the user, in order to determine the quality of their workout and the progress of their treatment.

In an exercise application, this user movement and force data can be sent to approved caregivers, in order to allow compliance monitoring, and to improve the quality of care. Because the VR environment is controlled by a computer processor, the 'Motion Environment' can function independently of an 'overlay', to allow the same workout (or physical therapy) to be offered to users with different VR tastes. Physical therapy motion paths to rehabilitation after hip replacement surgery, for example, may be overlaid with a VR environment that can simulate walking in a Tuscan hill-town for one, or storming Normandy for another, since different virtual experiences may be overlaid at will.

In another embodiment, the four-arm, articulated VR movement apparatus 300 can be used without motors. Instead, each of the 12 main joints 315 can be use with an electronically-activated clutch to engage, disengage, or precisely vary the amount of resistance at any vector of the arms 303 and connected linkages. In this way, the user would feel the force feedback, for example, when their hand 'touched' a table, since that motion direction would be denied by the engaging of the clutch to stop motion in that particular direction. A combination of clutch engagements (X, Y and Z) would result in the simulation of a physical surrounding.

In another embodiment, the foot bindings 309 and the hand gimbal grips 307 can each contain electromagnetic clutches at each pivot or joint 316 that can allow the VR software to control the VR movement apparatus 300. Depending up the VR environment being simulated, the VR software can allow free motion, stop all motion, or adjust the resistive force of the motion for each of the foot bindings 309 and the hand gimbal grips 307. This improves the quality of the simulation, for example, if a user chooses to 'virtually climb' the Eiffel Tower, the handgrips should suggest that they are gripping a solid, stationary object. In this case, the VR software would deny motion of the gimbal at the grip to improve the illusion. As the arms 303 of the VR movement apparatus 300 can move in sync with the climbing motion of the user, the grip would release pressure in a regulated manner so that the grip would move along with the motion that the user might expect.

In an embodiment, the inventive systems can be used with virtual gaming systems where users can wear VR headsets, where the player's eyes are focused on stereoscopic projections of a single environment, can provide visual images that provide a sense of transposition in a computer generated 3D virtual environment. These VR systems can effectively trick the eyes of a system user into believing that a transformation has taken place. Other VR systems can instead or additionally create a simulated immersive environment, where the user may turn their head in any direction, as one would in the 'real' world, further enhancing the sense of a virtual reality. However, this visual VR effect can be limited to the eyes, since the VR system only includes a headset that covers the eyes. These headsets used with the VR systems may only provide a limited overall sense of transposition, since the reality seen by the eyes often contradicts what should be felt by the hands and feet of the user. The inventive VR system overcomes these issues by coordinating the haptic senses with the visual senses in a VR environment. Coordinated motion of the four armatures may be used to create effects within the experience. The armatures may suddenly create a rapid descent, momentarily simulating the weightlessness that the user would feel in a real-world free-fall.

In different embodiments, the VR systems can be used for other applications including exercise. The obesity epidemic facing the US and beyond often points back to the sedentary lifestyle. Minimal exercise is required to maintain decent health, though a gym environment which may be the only option for many in bad weather locations can be less than compelling to many who are most in need of exercise. As discussed, the VR system can be a possible exercise apparatus, which can more enjoyable, more private and adjustable to the needs of the user.

Because the VR movement apparatus can be tuned to the specific needs of the user, it can be useful for physical therapy (PT). If undertaken for the correctly prescribed amount of PT exercise, will often rehabilitate a patient recovering from a medical intervention. But this PT treatment can be tedious and laborious, and is often dismissed by patients who may need to do PT alone. This, in effect, undermines the efficiency of the treatment. Physical Therapy often must be done with accurate, limited and deliberate motion (direction and range), and with specific force pressures correlated to the progress of the treatment. A PT would ideally prefer to prescribe a course of treatment with exact specifications, and closely monitor the results and progress. The VR movement apparatus can run VR software which can require a specific type of exercise and body movement, monitor the force feedback to insure compliance with a PT exercise schedule, store and forward the patient data to a physical therapist and doctors.

Both physical therapy and personal training base their success upon compliance and progress monitoring. Currently, the physical therapists and personal trainers outline a course of action for their patients and clients, assuming that they will receive honest and accurate progress reports from the patients and clients. The reality of this may vary greatly. For best results, the physical therapists and personal trainers could watch the progress remotely, and adjust the course of treatment as needed. The VR movement apparatus can run physical therapy or personal training software which can require a specific type of exercise and body movement, monitor the force feedback to insure compliance with a PT exercise schedule, store and forward the patient data to a physical therapist and doctors.

In different embodiments, the VR movement apparatus 100, 300, 505 can be used for various other applications. For example, Spinal Cord Injury (SCI) patients who require wheelchairs for motion must have professional physical therapy in order to allow regular motion to their limbs. This is costly, and requires dependence on another person for simply moving the legs. In an embodiment, the VR movement apparatus 300 can be used to exercise the patient's legs only. Additionally, for this population, a source of escapism and sense of physical freedom offers a quality of life improvement.

In some embodiments, the VR movement apparatus 100, 300, 505 can be used for other health issues. Obesity remains a major health concern for the world. Children now grow up playing video games, sedentary, for long hours. This is a primary cause of Type II Diabetes, heart issues, digestive issues, and, ultimately, limb loss. Children often prefer video games over gyms, playgrounds, fields and other physical outdoor activities. They need a source of exercise that, in their perception, is a video game. Ideally, this 'video game' is more compelling than what can be found at home, giving them a reason to immerse in a greater experience. In an embodiment, the VR movement apparatus 100, 300, 505 can be used with video game VR software that can be designed to be entertaining to the children and may simulate outdoor physical activity.

People with different personalities may be motivated to physical activity by different forms of motivation. While one person may be inspired by competition, another may choose escapism, and another chooses instead physical training or learning new skills. Current gym equipment does not respond to individual interests or inspirations. Equipment that could deliver user-tailored workout environment experiences would likely motivate a new range of people to enjoy the benefits of physical fitness.

The proposed invention allows the user free range of motion, while giving the force feedback of physical contact with a virtual environment. The users may choose where to locate their handholds and footholds as they climb, inviting them to explore however they choose. Because the virtual environment is created by computer, it may be scaled or adapted to the needs of each user.

Figure 22:
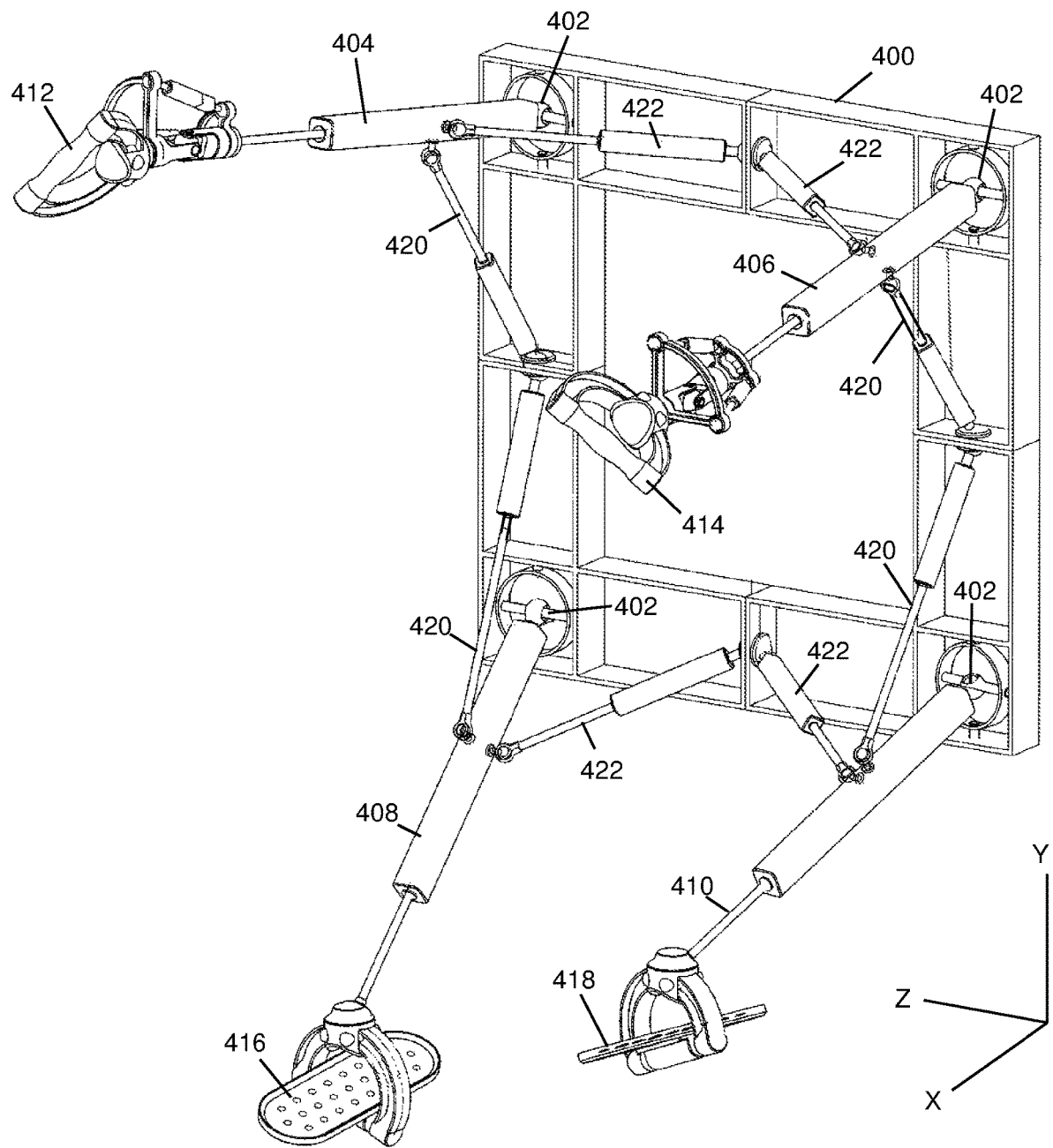
FIG. 22 illustrates perspective view of an embodiment of a VR movement apparatus.
Figure 23:
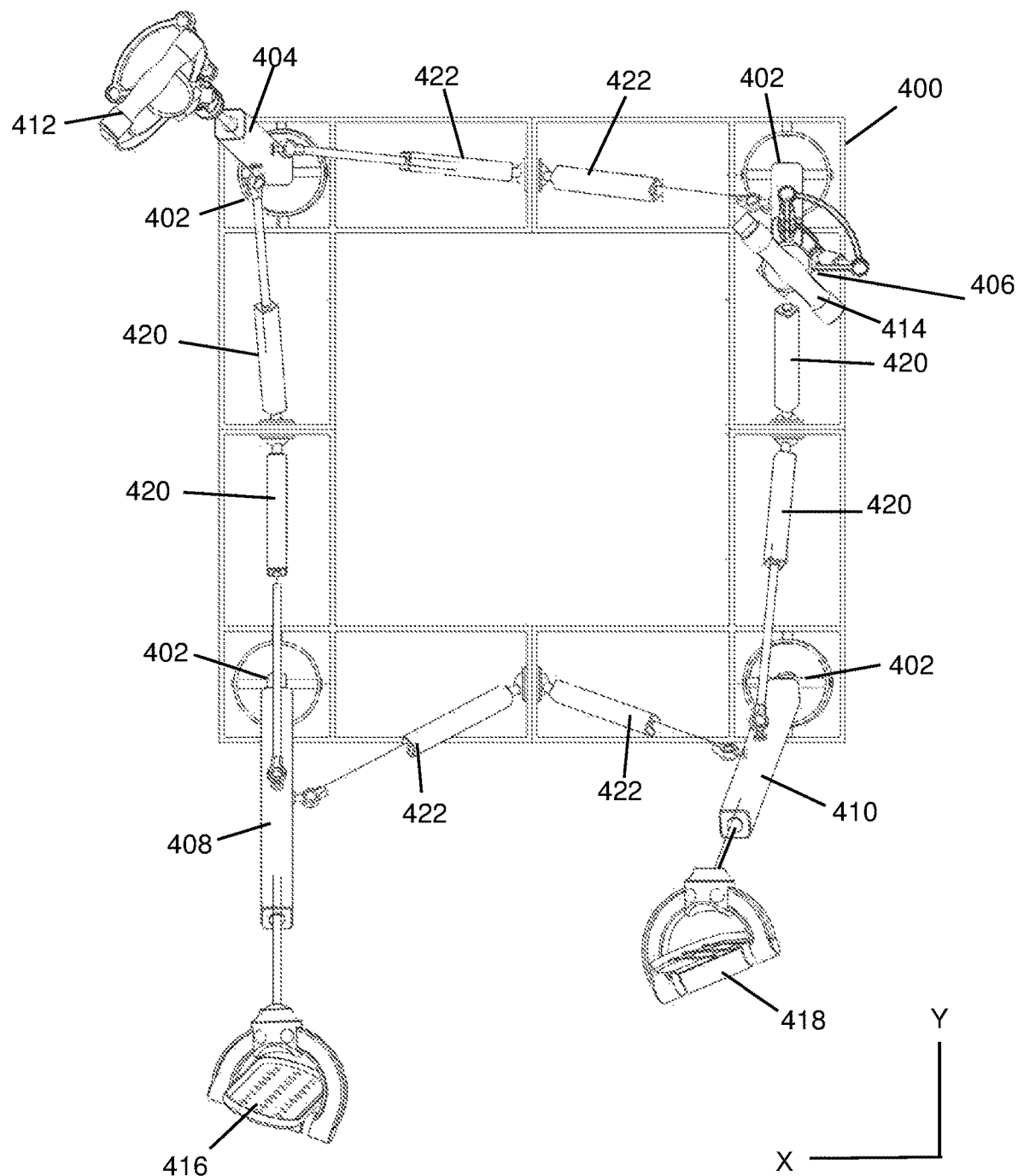
FIG. 23 illustrates front view of an embodiment of a VR movement apparatus.
Figure 24:
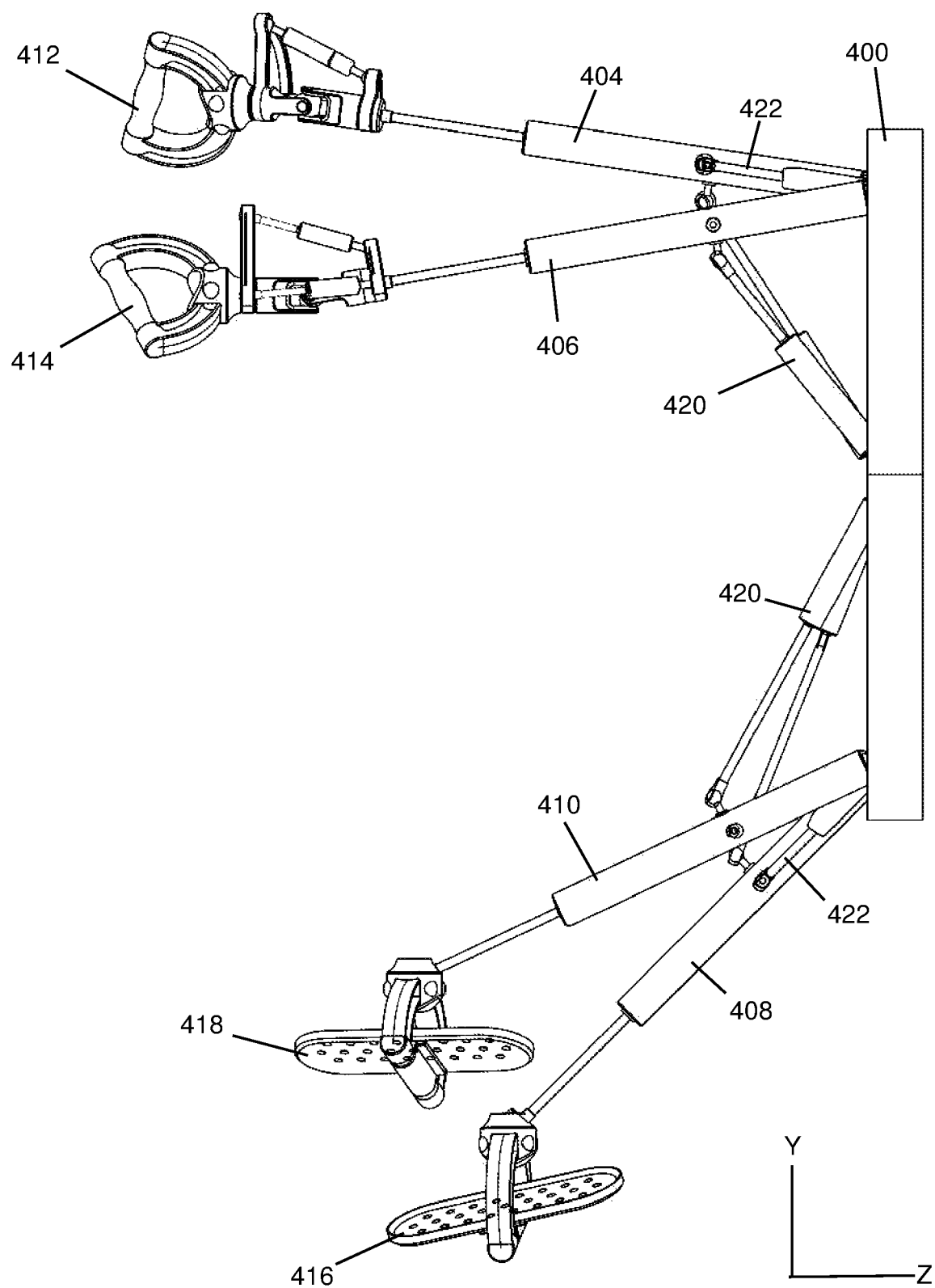
FIG. 24 illustrates side view of an embodiment of a VR movement apparatus.

With reference to FIGS. 22-24, in yet another embodiment the VR haptic movement apparatus. FIG. 22 illustrates a perspective view, FIG. 23 illustrates a front view and FIG. 24 illustrates a side of the VR haptic movement apparatus. The VR haptic movement apparatus can utilize four linear actuators 404, 406, 408, 410 which have proximal ends that are mounted on a frame 400 and distal ends coupled to the hand grips 412, 414 and foot holds 416, 418. The frame 400 can be rigidly mounted to a wall or the frame 400 can be rigidly secured to a floor. In the illustrated embodiment, the VR movement apparatus has four actuators: a left hand actuator 404, a right hand actuator 406, a left food actuator 408, and a right foot actuator 418. Each of the hand actuators 404, 406 and foot actuators 408, 410 can have a primary linear actuator that extends outward in the X direction away from the frame 400. Frame gimbals 402 can be mounted to the frame 400 to allow the hand actuators 404, 406 and foot actuators 408, 410 to rotate freely relative to the frame 400. The distal ends of the hand actuators 404, 406 are coupled to the hand grips 412, 414 with hand grip interfaces 426. The distal ends of the foot actuators 408, 410 are coupled to the foot holds 416, 418 with foot hold interfaces 428.

In the illustrated embodiment, two angular control linear actuators 420, 422 can control the angular positions of each of the primary linear actuators 404, 406, 408, 410 relative to the frame 400. The distal ends of the angular control linear actuators 420, 422 can be coupled to a middle portion of the primary linear actuators 404, 406, 408, 410 and the proximal ends of the angular control linear actuators 404, 406, 408, 410 can be coupled to the frame 400. In the illustrated embodiment, vertical angular control linear actuators 420 can be configured to control the vertical rotational position of the corresponding hand grip 412, 414 or foot hold 416, 418. Horizontal angular control linear actuators 422 can be configured to control the horizontal rotational position of the corresponding hand grip 412, 414 or foot hold 416, 418.

In the illustrated embodiment, the proximal end of the vertical angular control linear actuators 420 can be vertically aligned with the proximal end of the primary linear actuators 404, 406, 408, 410 and the proximal end of the horizontal angular control linear actuators 422 can be horizontally aligned with the proximal end of the primary linear actuators 404, 406, 408, 410. The proximal ends of the primary linear actuators 404, 406, 408, 410 and the angular control linear actuators 420, 422 can be rotational couplings that allow the primary linear actuators 404, 406, 408, 410 to rotate relative to the frame 400. By controlling the extensions of the primary linear actuators 404, 406, 408, 410 and the angular control linear actuators 420, 422, the positions of the corresponding hand grips 412, 414 and foot holds 416, 418 can be precisely positioned within a limited hemispherical volume extending away from the plane of the frame 400. The range of motion of the primary linear actuators 404, 406, 408, 410 can control the range of motion of the hand grips 412, 414 and foot holds 416, 418.

In the illustrated embodiment, the hand grips 412, 414 can coupled to angular and rotational controls that are coupled to a controller. The primary linear actuators 404, 406, 408, 410 and the angular control linear actuators 420, 422, control the positions of the corresponding hand grips 412, 414 and foot holds 416, 418. Each of the linear actuators can be coupled to a controller which can normally allow free movement or prevent movement of the user's hands and feet. The controller can also restriction the movements of the hand grips 412, 414 and foot holds 416, 418. The restricted movements can correspond or be synchronized with visual signals that is displayed on a VR headset worn by the system user. As discussed, the controller can prevent the movement of the hand grips 412, 414 and foot holds 416, 418 through virtual solid objects which can also be displayed through the VR headset. The controller can allow but provide resistance against movement of the hand grips 412, 414 and foot holds 416, 418 through virtual loose, elastic or fluid materials. For example, the system may provide movement resistance to the foot holds 416, 418 when a user is virtually running through surfaces such as snow, sand, water, mud, etc.

In the illustrated embodiment, the linear actuators 404, 406, 408, 410, 420, 422 are elongated structures that extend and contract in a straight line. The variable length of the linear actuators 404, 406, 408, 410, 420, 422 are controlled by a controller that can transmit control signals to the linear actuators 404, 406, 408, 410, 420, 422. The control signals can be electrical signals which drive electric motors. In an embodiment, the linear actuators 404, 406, 408, 410, 420, 422 can include a rod that moves within a housing. The movement of the linear actuators 404, 406, 408, 410, 420, 422 can be controlled by linear motors in the housings which can be functionally the same as a rotary electric motor with the rotor and stator circular magnetic field components laid out in a straight line. The linear motor can have magnetic pole faces and magnetic field structures that extend across the length of the actuator. Since the linear motor moves in a linear fashion, no lead screw is needed to convert rotary motion to linear. The linear actuators can be telescoping linear actuators made of concentric tubes that extend and retract like sleeves, one inside the other, such as the telescopic cylinder. The linear actuators can use actuating members that act as rigid linear shafts when extended. In other embodiments, the linear actuators 404, 406, 408, 410, 420, 422 can be controlled by other mechanisms such as pistons that slide within cylinders with hydraulic pressure or threaded lead screws that rotated within threaded couplings where the speed of the rods is proportional to the rotational velocity of the rods. In an embodiment, the linear actuator can be made an electric cylinder EPCO made by Festo.

Figure 25:
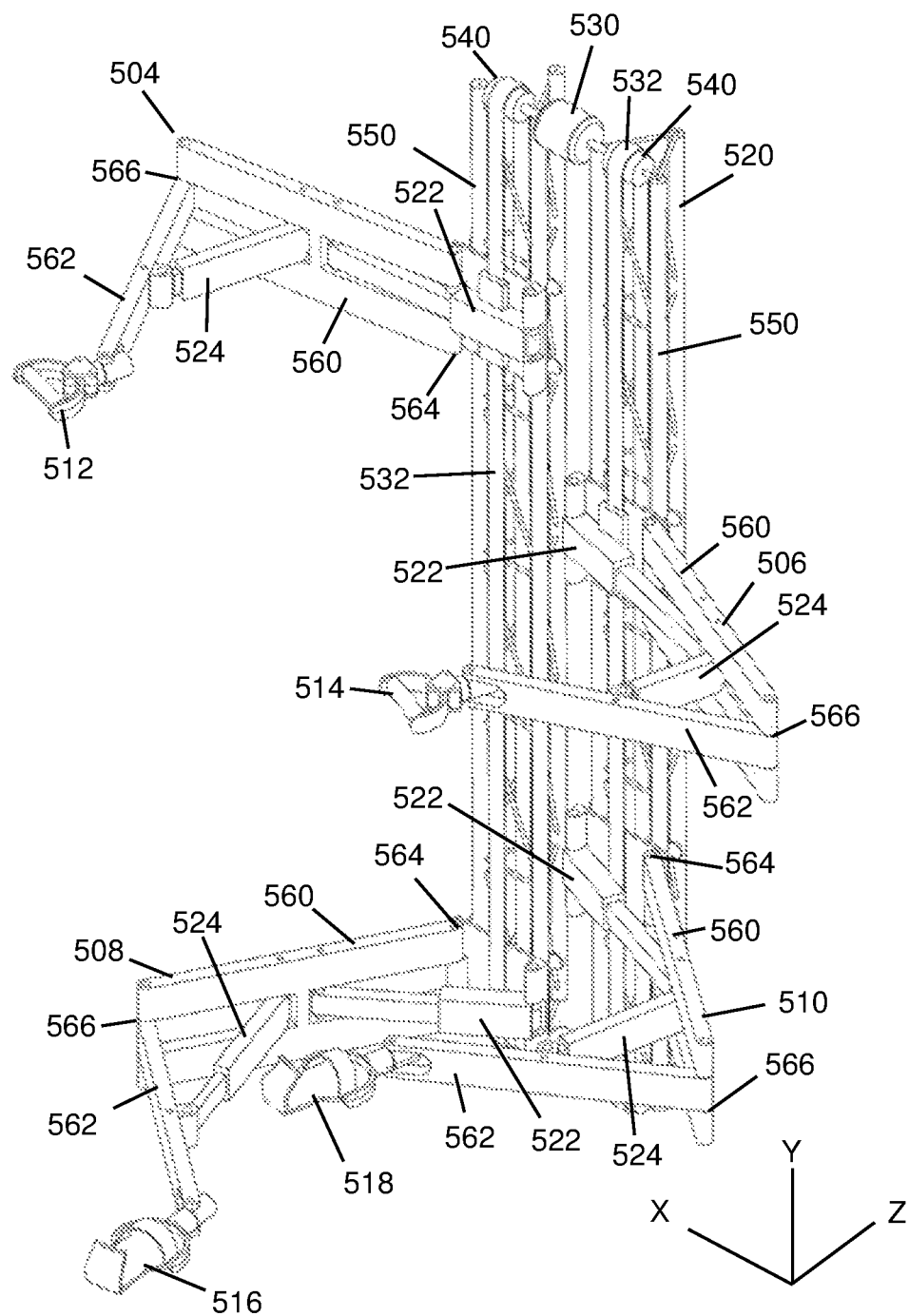
FIG. 25 illustrates perspective view of an embodiment of a VR movement apparatus.

With reference to FIG. 25 in yet another embodiment of the VR haptic movement apparatus is illustrated. In this embodiment, the frame 520 coupled to a left hand actuator 504, a right hand actuator 506, a left foot actuator 508, and a right foot actuator 510. Each of the limb actuators 504, 506, 508, and 510 are coupled to vertical actuators which include: cars 542, belts 532, tracks 550, motors 530 and pulleys 540. The cars 542 are coupled to belts 532. The cars 542 travel on vertical tracks 550 which are rigidly coupled to the frame 520. The belts 532 are configured parallel to the vertical tracks 550 and the belts 532 and cars 542 can be moved with motors 530 which control the vertical positions of cars 542 which are coupled to the left hand actuator 504, the right hand actuator 506, the left foot actuator 508, and the right foot actuator 510. The belts 532 can be mounted on pulleys 540 that are on the top and bottom of the frame 520. The pulleys 540 can rotate on axis that is horizontal and parallel to the plane of the frame 520.

The left hand actuator 504, the right hand actuator 506, the left foot actuator 508, and the right foot actuator 510 can each include an inner arm 560 and an outer arm 562. Proximal ends of the inner arms 560 can be coupled to the cars 542 with car hinges 564 having a vertical axis of rotation. Similarly, the distal ends of the inner arms 560 can be coupled to outer arms 562 with arm hinges 566 also having a vertical axis of rotation. Thus, the vertical axis of rotation of the car hinges 564 and the arm hinges 566 are parallel to the plane of the frame 520. The left hand grip 512 is coupled to the distal end of the left hand actuator 504 and the right hand grip 514 is coupled to the distal end of the right hand actuator 506. The left foot hold 516 is coupled to the distal end of the left foot actuator 508 and the right foot hold 518 is coupled to the distal end of the right foot actuator 510.

The vertical positions of the left hand actuator 504, the right hand actuator 506, the left foot actuator 508, and the right foot actuator 510 are controlled by the positions of the cars 542 and vertical belts 532. The inner arms 560 and outer arms 562 can move within horizontal planes which are perpendicular to the plane of the frame 520. Extension actuators 524 can each have a proximal end coupled to a middle portion of the inner arms 560 and a distal end coupled to a middle portion of the outer arms 562. The extension actuators 524 can contract to reduce or expand to increase the distances between the cars 542 and the corresponding distal ends of the left hand actuator 504, the right hand actuator 506, the left foot actuator 508, and the right foot actuator 510. The angular position of the distal ends of the left hand actuator 504, the right hand actuator 506, the left foot actuator 508, and the right foot actuator 510 relative to the corresponding cars 542 can be controlled by the horizontal angular actuators 522. In the illustrated embodiment, contraction of the horizontal angular actuators 522 in the left hand actuator 504 and the left foot actuator 508 will cause the distal ends of these actuators 504, 508 to move from left to right in a negative X-axis direction and expansion of the horizontal angular actuators 522 in the left hand actuator 504 and the left foot actuator 508 will cause the distal ends of these actuators 504, 508 to move from right to left in a positive X-axis direction. Conversely, contraction of the horizontal angular actuators 522 in the right hand actuator 506 and the right foot actuator 5100 will cause the distal ends of these actuators 506, 510 to move from right to left in a positive X-axis direction and expansion of the horizontal angular actuators 522 in the left hand actuator 504 and the left foot actuator 508 will cause the distal ends of these actuators 504, 508 to move from left to right in a negative X-axis direction. The inner arm of the actuators 504, 506, 508, 510 are coupled to cars 542 with a car hinge having a vertical axis. Thus, the movement of the horizontal angular actuators 522 causes the actuators 504, 506, 508, 510 to rotate about the hinge coupled to cars 542.

In the illustrated embodiment, the actuators 504, 506, 508, 510 have an inner arm 560 and an outer arm 562 that are coupled to an arm hinge having a vertical axis. The extension actuator 524 can include a proximal end coupled to a middle portion of the inner arm 560 and a distal end coupled to the middle portion of the outer arm 562. The contraction of the extension actuator 524 causes the outer arm 562 to rotate about the arm hinge towards the inner arm 560 and expansion of the extension actuator 524 causes the outer arm 562 to rotate about the arm hinge away from the inner arm 560. The horizontal positions of the left hand grip 512, right hand grip 514, left foot hold 516 and right foot hold 518 are controlled by the angular actuator 522 and extension actuator 524. Thus, linear movement of the left hand grip 512, right hand grip 514, left foot hold 516 and right foot hold 518 in the horizontal plane requires the coordinated controlled actuation of the angular actuator 522 and extension actuator 524. Similarly, linear movement in three dimensional space of the left hand grip 512, right hand grip 514, left foot hold 516 and right foot hold 518 in the horizontal plane requires the coordinated controlled actuation of the angular actuator 522, extension actuator 524 and the vertical actuators.

In the illustrated embodiment, the left hand actuator 504, the right hand actuator 506, the left foot actuator 508, and the right foot actuator 510 are each coupled to a car 542 which is coupled to a belt 532 driven by a motor 530 that moves the car 542 on a track 550. The tracks 550 can be tubular straight structures. The cars 542 can have bearings, bushings or wheels that allow the cars 542 to smoothly travel up and down the track 550 with low movement friction.

In an embodiment, two cars 542 can be releasably attached to each of the two belts 532. More specifically, a first belt 532 can be releasably coupled to a first car 542 attached to the left hand actuator 504 and a second car 542 attached to the right hand actuator 506. When the car 542 is attached to the belt 532, the car 542 will move with the belt 532 and when detached from the belt 532, the car 542 can be locked in a stationary position on the track 550. The cars 542 A user will normally move the left hand vertically, while the right hand is vertically stationary and move the right foot vertically while the left foot is stationary. The system can respond by attaching the left hand actuator 504 to the belt 532 and moving the belt 532 in the direction of user's left hand movement. Simultaneously, the right hand car 542 can be released from the belt 542 and held in a stationary position on the track 550 while the right foot is stationary. The right hand actuator 504 can be attached to the belt 532 and the belt 532 can be moved in the vertical direction of user's right foot movement. Simultaneously, the left foot car 542 can be released from the belt 542 and held in a stationary position on the track 550 while the left foot is stationary. The user may then switch the vertical movements by stopping the vertical movement of the left hand and right foot and switching to move the right hand and the left foot. The system can respond by releasing the left hand car 542 and the right foot car 542 and locking these cars 542 in stationary vertical positions on the track 550 and attaching the right hand car 542 and the left foot car 542 to the belts 532. The system can track the movement of the user's right hand and left foot. The system can track these movements and move the belts 532 to match the right hand and left foot movements.

Figure 26:
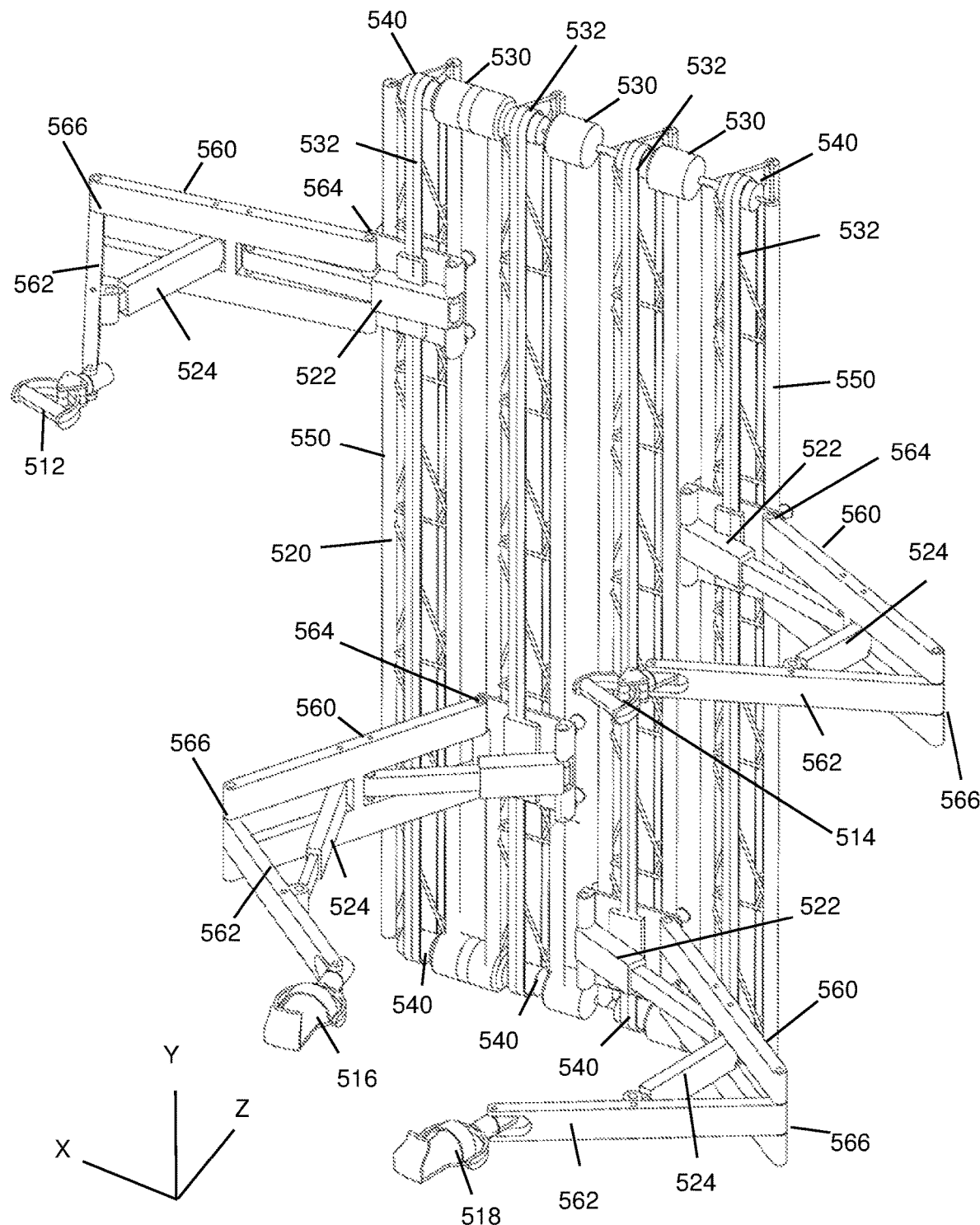
FIG. 26 illustrates perspective view of an embodiment of a VR movement apparatus.

In other embodiments, with reference to FIG. 26, the cars 542 of the left hand actuator 504, the right hand actuator 506, the left foot actuator 508 and right foot actuator 510 of the VR haptic system can each be coupled to one of the four separate belts 532. In this embodiment, the cars 542 can be attached to the belts 532 without having a release mechanism that releases the car 542 from the belt 532 and secures the car 542 to the track 550. In this system, the controller can move each of the cars 542 attached to the left hand actuator 504, the right hand actuator 506, the left foot actuator 508 and right foot actuator 510 independently based upon the detected or predicted movements of the user's hands and feet.

Figure 27:
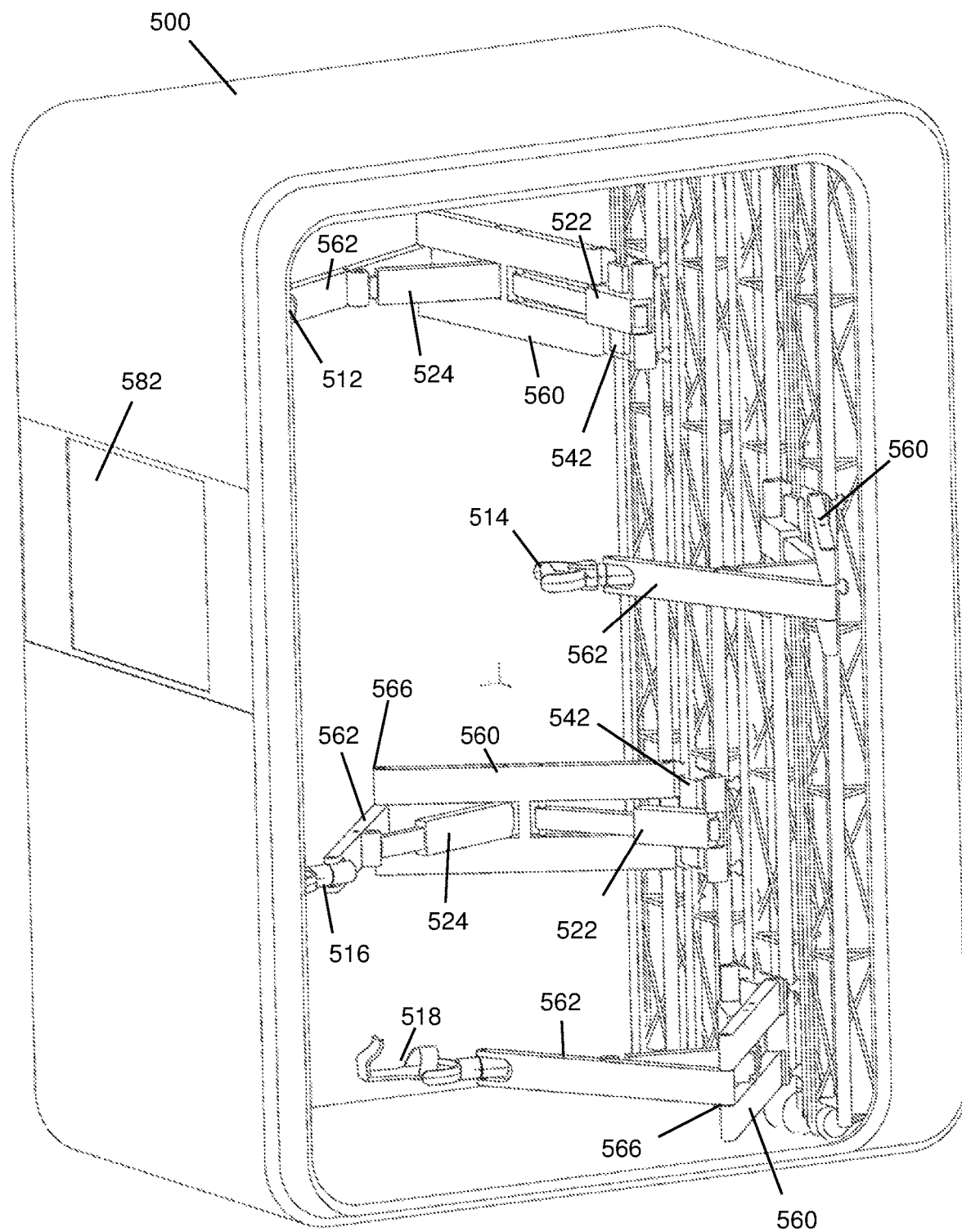
FIG. 27 illustrates perspective view of an embodiment of a VR movement apparatus in a housing.

With reference to FIG. 27, the VR haptic movement apparatus is illustrated in a housing unit 500 which surrounds the user. The housing 500 can provide a rigid structure which can provide support the user's weight and the entire VR haptic movement apparatus. In this embodiment, the housing 500 is a box structure which has open sides. The user can enter the housing 500 through a side opening and place the feet in the foot holds 516, 518, wear the VR googles and grasp the hand grips 512, 514. The interior volume of the housing 500 can be sufficient to allow the user to move in the full range of motion of the VR haptic movement apparatus. Thus, the full extension of the outer arm 562 and the inner arm 560 relative to the car 542 on the track 550. In an embodiment, the housing unit 500 can also include a user interface 582 which can be a visual touch screen device which can allow users or observers to control the settings or view the VR environment that the user is experiencing.

In an embodiment, the handholds and possibly the footholds can utilize universal joint grips that are coupled to joystick potentiometers for movement "intention detection." When using the haptic system, the user's quality of the experience correlates to the tactile 'invisibility' of the mechanical interface. The virtual reality physical illusion created by the system can depend on the users feeling that their hands are moving in an unencumbered manner. This physical unencumbered illusion can occur when the user does not feel the presence of that physical armature coupled to the handhold.

In an embodiment, the haptic system can detect a user's hand motion using sensitive pressure sensors in all directions in order to detect the slightest pressure. However, pressure sensors are expensive, may cause physical resistance to the user's motion in order to detect motion, and must be located relatively orthogonally to any potential motion by the user. Furthermore, sensors may only detect a narrow range of hand force pressures. Thus, both a fine pressure sensor and a heavier pressure sensor may be needed to cover the entire pressure range that a user's hand may exert during the operation of the haptic system. Achieving this illusion result can be difficult, since the device must detect the slightest intention of motion by the user's hand, without causing physical feedback detectable by the user.

With reference to FIGS. 28-33, an embodiment of a hand hold interface 451 with integrated pressure sensors 453 is illustrated. The hand hold interface 451 can have a handgrip 463 that is always held by the system user. The handgrip 463 can be connected to the machine using a universal joint, which allows for free, unencumbered motion of the user's hand in rotation and translation. The handgrip 463 can have a rod 459 which can have a rotational coupling that can allow or resist rotational movement of the handgrip 463. The rod 459 can be suspended by spring, piston, counterweight, or other method to a surrounding frame housing 457. In the illustrated embodiment, the rod 459 can be concentrically positioned within the interior volume of the cylindrical housing 457. A gimbal 455 is coupled to a proximal portion of the rod 459 and the housing 457. A sensor 453 can be coupled to a proximal portion of the housing 457 and the proximal end of the rod 457 so that movement of the handgrip 463 relative to the housing 457 will result in movement of the sensor 453. In an embodiment, the sensor 453 can have a joystick lever 465 mechanism which can detect the movement of the handgrip 463 relative to the housing 457 causes movement of the joystick sensor 453.

Figure 28:
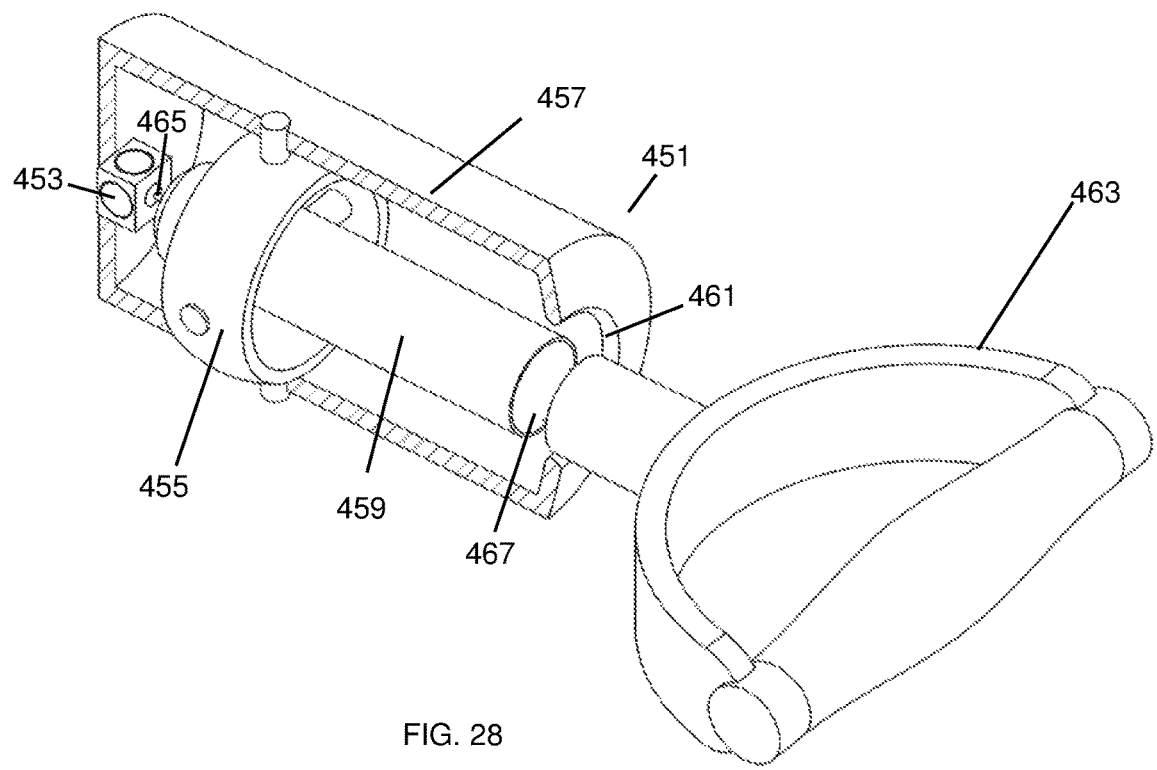
FIGS. 28-33 illustrates perspective and side views of an embodiment of a hand hold interface.
Figure 29:
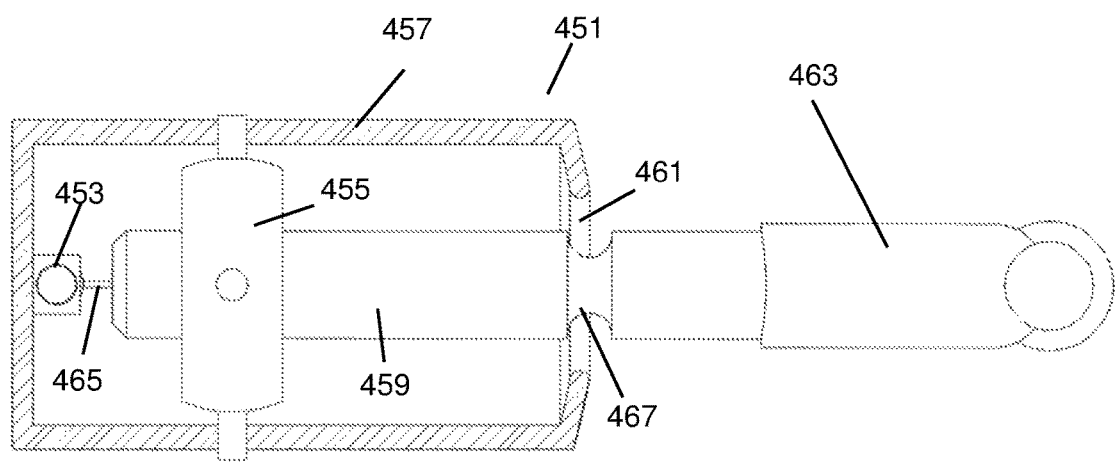

FIG. 28 is a perspective view of the sensor handgrip 451 and FIG. 29 is a side view of the sensor handgrip 451 that is suspended in a 'center-neutral' position with the rod 459 positioned in the center of the circular opening 461. The rod 459 can have a groove 467 which can be positioned adjacent to the edge of the circular opening 461. In an embodiment, the sensor handgrip 451 is able to translate in and out along a center axis, using telescoping components, which are connected to a linear potentiometer in order to measure that linear motion. In an embodiment, the telescoping components and linear potentiometer can be placed in the rod 459. In an embodiment, the telescoping components can also include a spring mechanism that can hold the telescoping components in a normal position when no compression or tension forces are applied to the telescoping components. When a compression force is applied to the sensor handgrip 451, the spring can be compressed and the linear potentiometer can output a compression signal. Conversely, when a tension force is applied to the sensor handgrip 451, the spring can be extended and the linear potentiometer can output a tension signal. By using a combination of a sensor 453 coupled to gimbal 455 and linear potentiometer coupled with sliding mechanical components, the handgrip 451 is able to move a specified amount in any direction, and the motion can be accurately measured by the potentiometers. A sensor 453 component is mounted to either the handgrip 451 or the housing 457, with the moving sensor 453 component interfacing with the opposite component. More specifically, the sensor 43 housing can be mounted to the rod 459 and a movement mechanism can detect relative movement with the housing 457. In the illustrated embodiment, the sensor 453 housing is mounted to the housing 457 and a component interfacing with the proximal end of the rod 459 is a joystick lever 465.

The joystick lever 465 of the sensor 453 in the handgrip 451 and the linear potentiometer can be in communication with a controller which can receive electrical signals from the joystick sensor 453 and the potentiometer. Thus, the controller can detect any movement of the handgrip 451. In this way, any motion of the grip 451 from its 'center/neutral' position is immediately detected by a displacement of the lever of the joystick sensor 453, relative to the machine's armature rod 459. The controller can include a processor running software that is configured to make the articulated armature keep the joystick lever of the joystick sensor 453 always at 'center-neutral' position (rod 459 centered in the circular opening 461) when the hand grip is in a virtual free movement space. More specifically, the controller will cause the corresponding primary linear actuator to be moved to counteract any displacement of the joystick lever so the articulated armature rod 459 is moved to the center of the circular opening 461 and the joystick lever 465 of the joystick sensor 453 is re-centered. The overall effect is that the user does not feel weight or resistance of the armature, since it always 'follows' the motion of a neutrally suspended grip 451, at a faster pace than the user can move. However, the controller can prevent or resist movement of the hand grip or foot hold through virtual objects.

Figure 30:
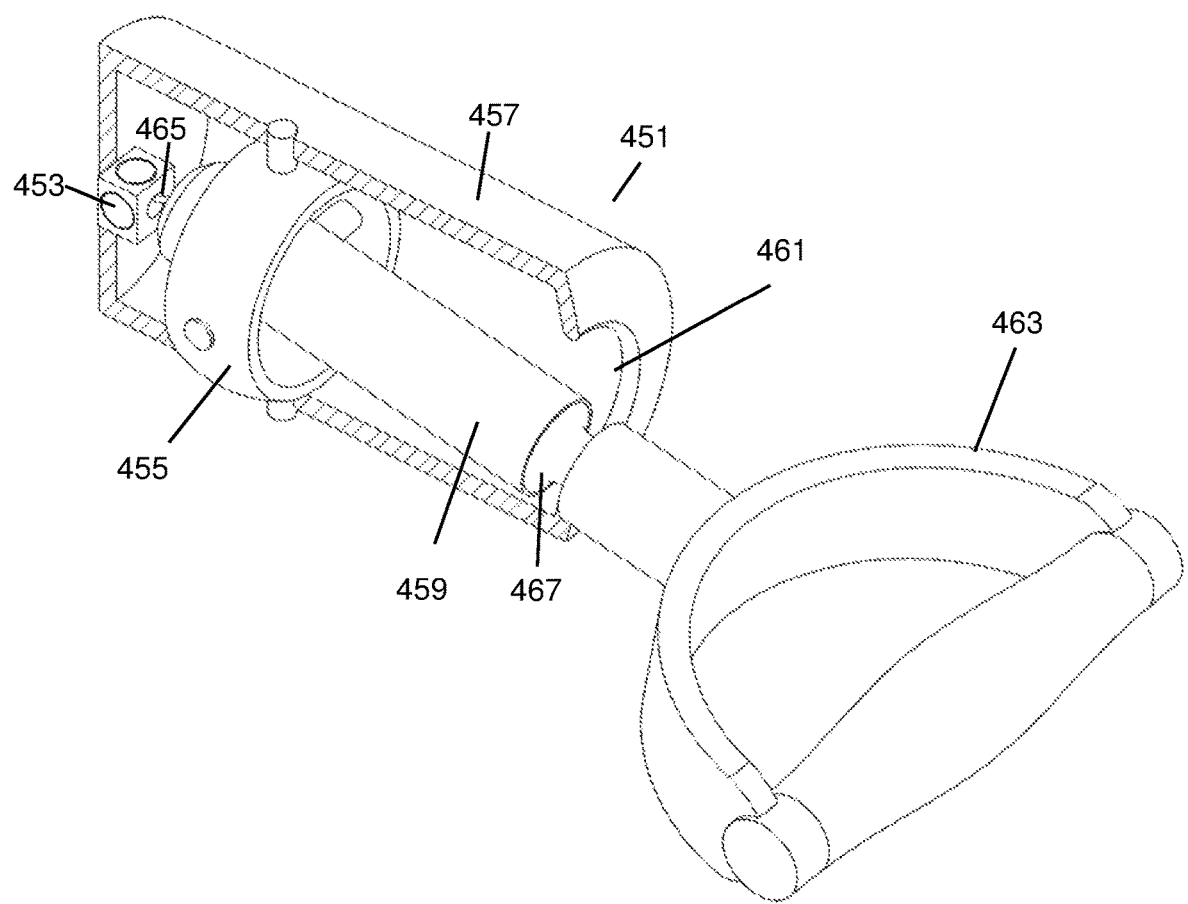
Figure 31:
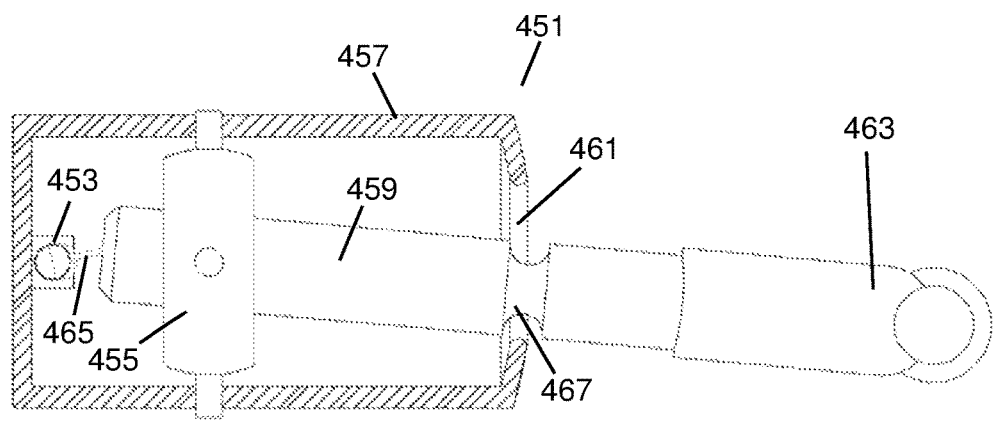

With reference to FIG. 30 is a perspective view of the movement sensor handgrip 451 and FIG. 31 is a side view of the sensor handgrip 451. The handgrip 463 and rod 459 have been moved by the user out of the 'center/neutral' position in the that is in an off center position with the rod 459 positioned lower than the center/neutral position in the circular opening 461. This movement of the rod 459 indicates that the user has initiated a move of the handgrip 463 in a downward direction. The system can detect any movement direction within a 360-degree sphere that can be moved in by the user based upon the movement of the rod 459 in combination with compression or tension detected by sensors such as potentiometers. In other embodiments, the compression or tension can be detected with other sensors such as strain gages. The joystick sensor 453, opposite the handgrip 463, has detects the movement and emits an electrical signal that the user is moving in a direction. The electrical movement signal can be communicated to the controller CPU, which can interpret this signal as a motion by the user. The CPU can calculate the motion required to return the joystick sensor 453 back to a 'centered/neutral' position. The controller CPU can cause the distal end of the corresponding linear actuator can move as rapidly as the user's hands or feet to restore the centered/neutral position of the joystick sensor 453. Thus, the controller CPU can 'mirror' the user's motion.

As discussed, the hand grips and foot holds are attached to the distal ends of different primary linear actuators. During normal operation, the controller CPU can respond to this detected movement by moving the distal end of the primary linear actuator to re-center the rod 459 in the circular opening 461. Because the system moves the hand grips and foot holds in response to user movements, the user does not detect that the hand grips and foot holds are following the user's motion. In an embodiment, the controller can predict the movements of the user's limbs and move the distal end of the primary linear actuator to the predicted future positions.

Figure 32:
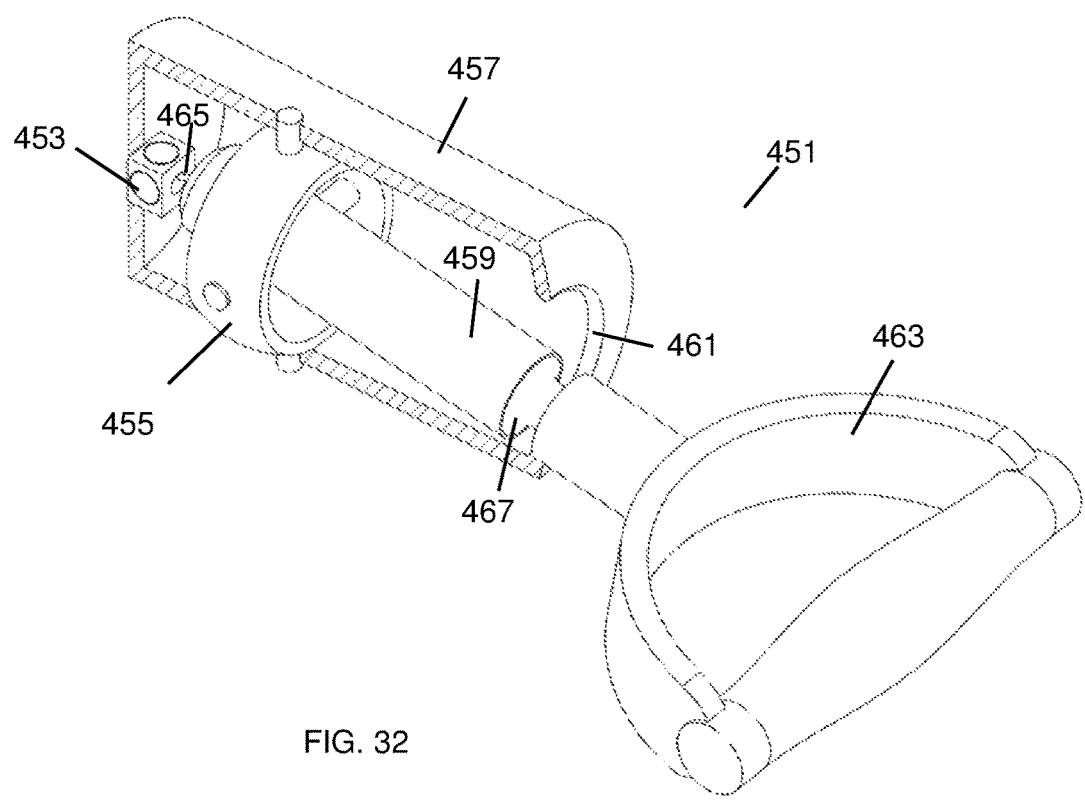
Figure 33:
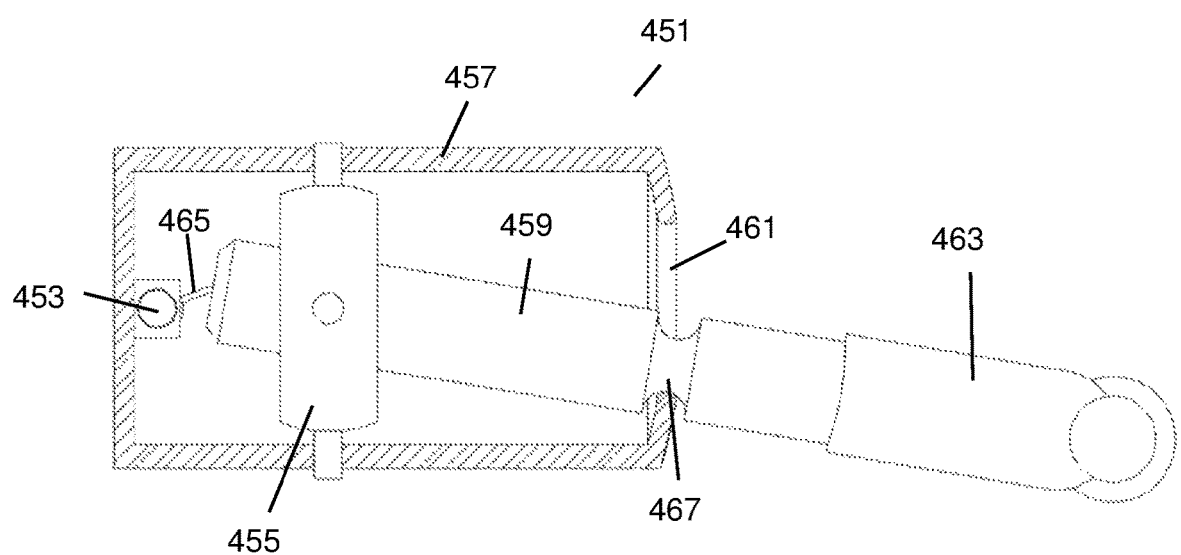

With reference to FIG. 32 is a perspective view of the sensor handgrip 451 and FIG. 31 is a side view of the sensor handgrip 451 that is in an off center position with the rod 459 positioned against the lower stop edge of the circular opening 461. The rod 459 may contact the stop position when the controller cannot keep up with the re-centering movement of the primary linear actuator. The contact with the edges of the circular opening 461 can protect the internal components of the sensor hand grip 451 including the joystick sensor 453, potentiometers, and any other fragile system components. The contact of the rod 459 with the edge stop of the circular opening 461 can occur just before or when a user virtually contacts a virtual asset such as a virtual object in the VR space. In an embodiment, the hand grip or foot hold can stop all motion. The user can attempt to continue their motion in the direction of the asset or virtual object, however the controller can cause the linear actuators prevent movement through virtual objects and the system no longer mirrors the user's motion. When the rod 459 physically collides with the edge of the circular opening 461 of the housing 457, this creates the very real sensation that the user has collided with the virtual entity. As long as pressure is exerted by the user in the direction of the virtual, solid entity, the armature will remain locked, and the grip arm will remain bottomed out against the chasses.

If the user intends to release their virtual grip on or contact with the virtual entity, the user can do so by moving their hand (or feet) and therefore the rod 459 in a different direction. If the system user pulls the handgrip 463 (or foot hold) away from the virtual assets or virtual object, the controller will again move with the user. The Joystick senses that the user has moved their hand position, indicating that they have released their virtual grip. At a designated angle before a 'centered/neutral' position is reached, the controller CPU returns the armature to 'mirror mode', where the primary linear actuators once again move in response to all detected motions of the user's hand.

Figure 34:
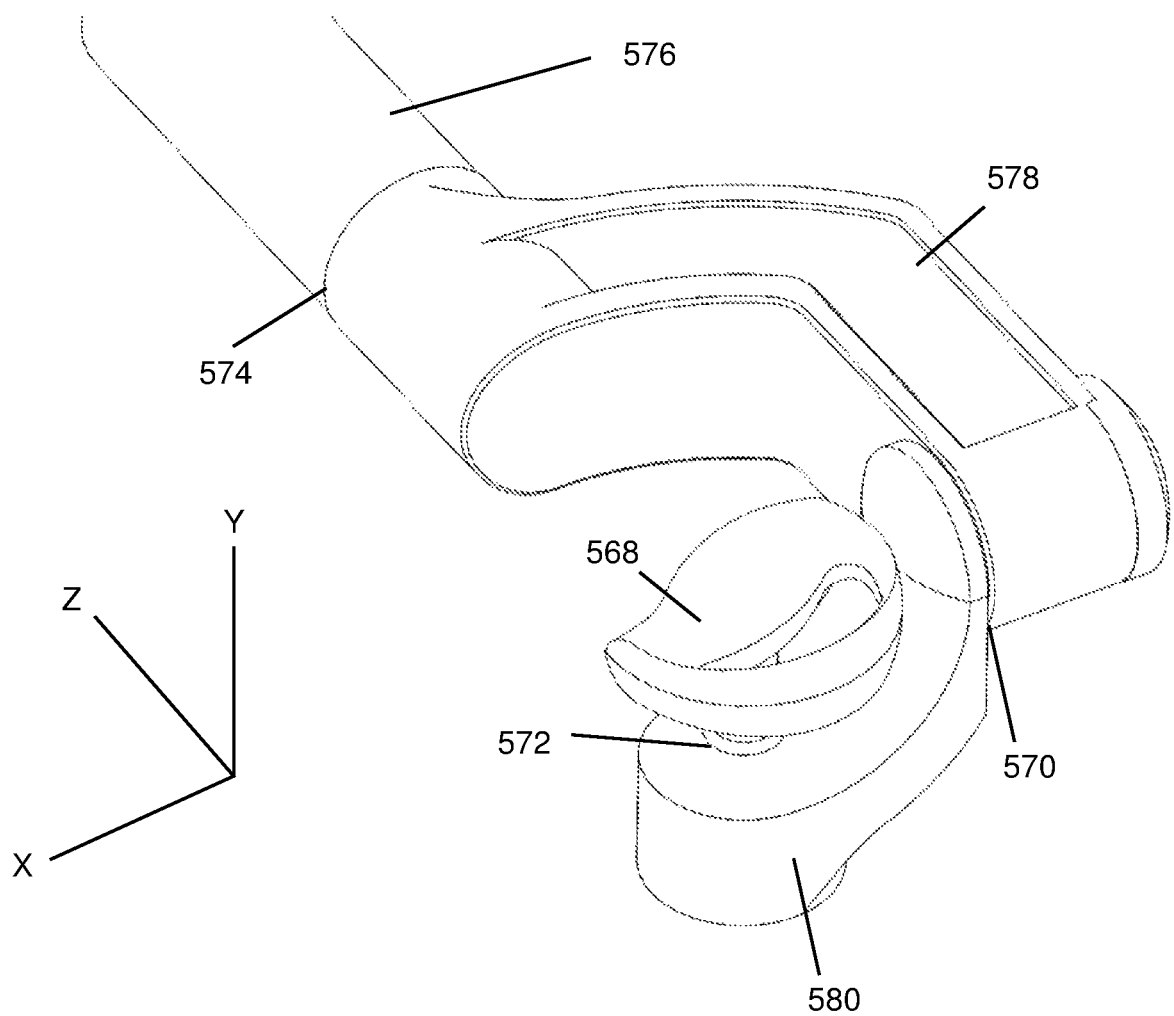
FIG. 34 illustrates a perspective view of an embodiment of a hand grip mounted on rotational mechanisms.

The different VR haptic apparatus can have gimbaled hand grips which can provide a full range of motion in three axes. The inventive VR haptic apparatus described above requires the user to maintain constant contact with the physical interface components including the hand grips, while moving their hand in any natural position in their range of motion. To achieve this with reference to FIG. 34, the hand grip 568 is mounted to a vertical y-axis rotational movement mechanism 572, which is mounted to a linkage 580, which allows the hand grip 568 to rotate about the y-axis relative to the linkage 580. The linkage 580 is coupled to a horizontal x-axis rotational movement mechanism 570 which allows the hand grip 568 to rotate about the x-axis relative to the linkage 578. This linkage 578 is mounted to a z-axis rotational movement mechanism 574 which allows rotation of the hand grip 568 about the z-axis relative to the arm 576. The hand grip 568 can be coupled to the linkage with universal joints. The combination of three axis movement allows any rotational position of the hand to be achieved while maintaining the user's grip on the VR haptic apparatus throughout the user's VR experience.

In an embodiment, the gimbal grip can have locking pivots which can be actuated by the VR control system. In order to create the 'haptic illusion' when the user contacts a virtual, solid object, the user's hand must feel as if it is contacting a solid, non-moving, physical object. The VR software is designed to detect when the user's hand position is within an acceptable proximity to or in contact with a virtual object that may be gripped in virtual space. When this proximity or contact is determined between the user and the virtual object, then the VR software can lock rotational components at each axis of the hand grip interface are actuated, stopping all motion of the gimbal. For example with reference to FIG. 32, when the rotational components are locked, the system can prevent the rotation of the hand grip 568 about x-axis movement mechanism 570, the y-axis movement mechanism 572, and the z-axis mechanism 574. The effect to the user is that the user will perceive contact with a physical, solid object adjacent to free open space. Upon moving their hand away from that object in a direction determined to be acceptable to the software, the VR software can disengage the locking components, allowing the gimbal to rotate freely in all directions once again. All rotational locks may be activated simultaneously when a user grips a virtual, solid entity such as a branch, for example to prevent rotation in any of the three axis of rotation. In another instance only a single lock may engage, in order to simulate the effect of making contact with a virtual, solid entity without grabbing it. Thus, the gimbal can rotate in two axes of rotation and lock in one axis of rotation. For example, in a simulated VR fist punching a virtual wall object would be able to rotate axially, though two other rotational (pitch and yaw) axis would lock, so that only one degree of freedom would be allowed.

In some embodiments, the locking pivots used in the hand grips or foot holds may be replaced with rotational motor actuators. The rotational motor actuators can allow free rotation, no rotation, limited in rotational range or possibly even having variable levels of rotational resistance. In these embodiments, rotational motion of the wrist through hand grips can be unencumbered, fully locked, or could allow specific range of motion to that hand's motion. This would allow the user to feel the sensation of gripping an object that moves either autonomously or in reaction to their pressure. If a user were to grasp a virtual tree branch, for example, the VR software can be configured to allow the virtual tree branch to bend under the user's downward weight or force. To create this physical illusion, the VR software can be configured so that the user would have to feel the grip of a solid object, the virtual branch, and then simulate the motion of the branch bending in a manner determined by the physical characteristics of the branch, and the wrist gimbal would rotate in such a way to simulate the angular orientation of the branch. In other embodiments, the VR software can provide users with simulated movement of other virtual objects. For example, the VR software can simulate the movement of a virtual skateboard rolling on a virtual surface. The user can step on the virtual skateboard and foot hold may slide in a horizontal direction that the skateboard is virtually rolling.

In an embodiment, the hand grips and foot holds of the VR haptic apparatus can include ball and socket 'float' to improve haptics. A joystick has a limited range of motion of the potentiometers comprising it. In order that the motion of the wrist gimbal assembly does not exceed this limited range of motion, a physical stop must be created. In the proposed invention, a moving toroid or sphere is mounted to the sliding, moving element. A negative of this component surrounds it, shaped by the angular offset determined by the desired range of motion limitation in all directions. When the user moves their hand in an unencumbered state, the sphere or toroid floats within this negative volume, never contacting it.

When the user's virtual hand approaches a virtual solid object, an eminent collision is detected. The software then locks the motion of the armatures allowing the sphere or toroid to continue in its path until it collides with the negative volume, stopping the motion of that grip, and creating for the user a sense that they have contacted a physical object. Simultaneously, the gimbal's locking pivots may engage, and all rotation is locked, further enhancing the sensation of that contact.

Figures 35, 36:
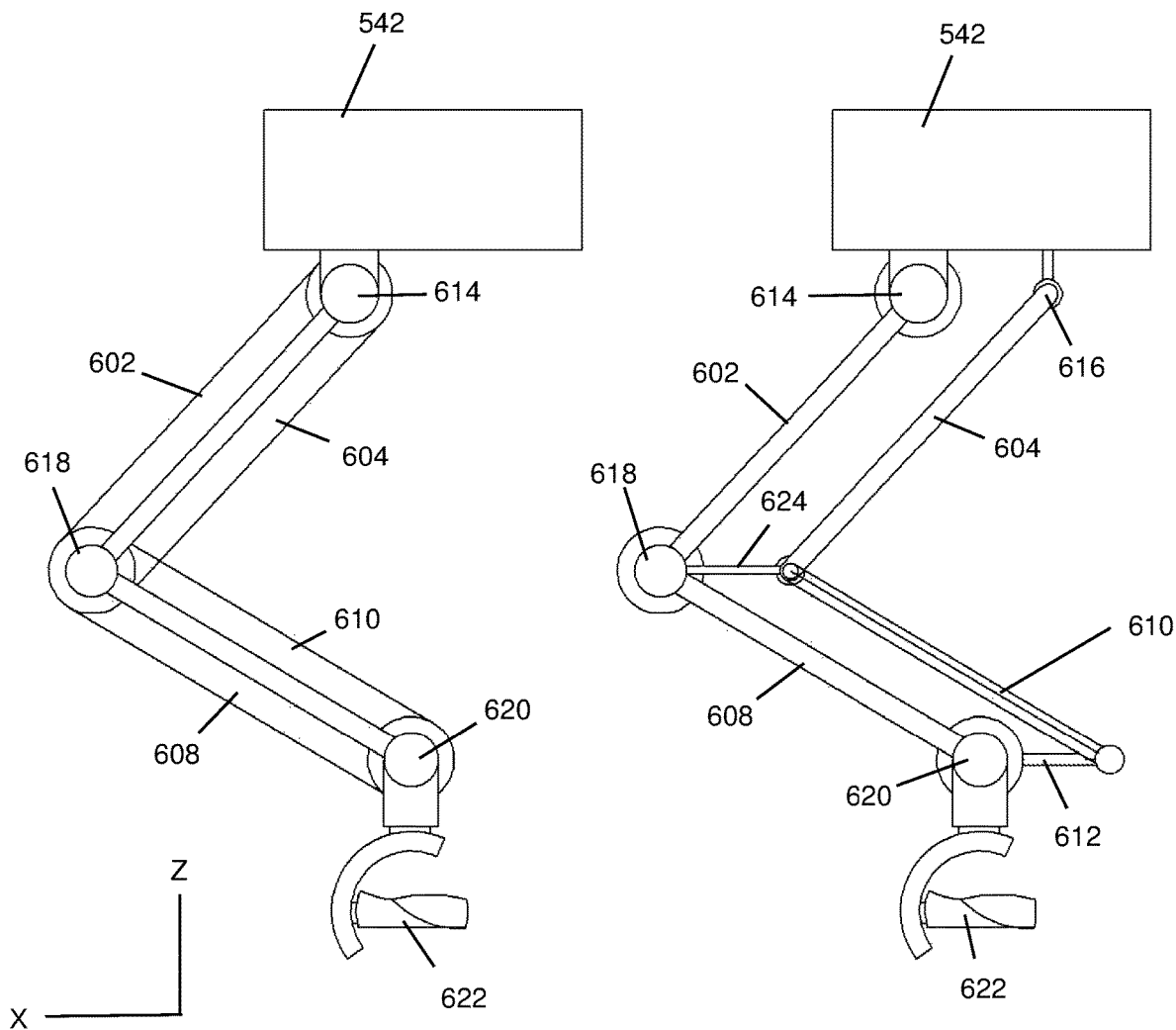
FIGS. 35-37 illustrate top views of linkage system arms for a VR movement apparatus.
Figure 37:
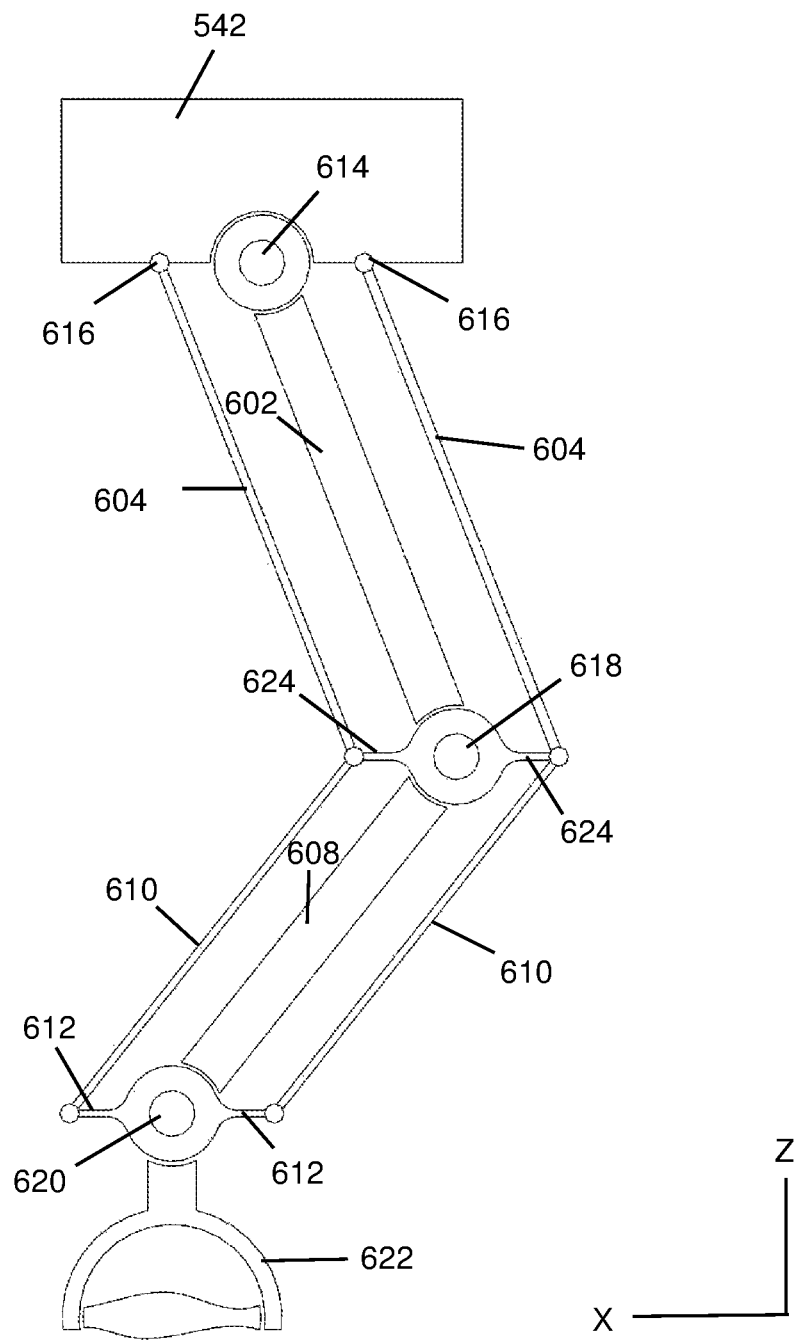

In an embodiment, the hand and feet actuators include parallelogram or pantograph linkages that allow the distal hand grip and foot hold ends of the armatures to remain parallel with back plane in any location to provide consistent baseline. With reference to FIGS. 35, 36 and 37, various embodiments of the linkages coupled to a car that moves vertically on a track mounted on a frame. The linkages can provide planar movement of the hand grips and foot holds in a horizontal plane. With reference to FIGS. 35, 36, and 37, the linkages can include a car hinge 614, an inner arm 602, an inner parallel linkage 604, an arm hinge 618, an outer arm 608, and an outer parallel linkage 610. The inner arm 602 and the inner parallel linkage 604 are parallel elongated structures. Similarly, the outer arm 608 and the outer parallel linkage 610 are also parallel elongated structures. The inner arm 602 can be coupled to the car 542 with a car hinge 614 and the outer arm 608 is coupled to a user interface hinge 620 which is attached to the hand grip 622. This parallel configuration of the parallel linkages is maintained regardless of the angular orientation of the inner arm 602 and the outer arm 608. If the linkage systems are used with foot holds, the user interface hinge 620 can be coupled to the foot holds rather than the hand grips 622.

The differences between FIGS. 35, 36 and 37 include the number of parallel linkages 604, 610, the relative positions of the inner arm 602 and the inner parallel linkage 604, and the relative positions of the outer arm 608 and the outer parallel linkage 610. FIG. 35 illustrates an inner parallel linkage 604 in close proximity to the inner arm 602 and an outer parallel linkage 610 in close proximity to the outer arm 608. For example, in this embodiment, the spacing between the arms 602, 608 and parallel linkages 604, 610 is between 5 to 20 centimeters. In contrast in FIG. 36, the inner parallel linkage 604 spaced farther apart from the inner arm 602 and the outer parallel linkage 610 farther apart from the outer arm 608. The inner parallel linkage 604 can be coupled to the car 542 with a separate linkage hinge 616 and an arm hinge offset 624. The outer parallel linkage 610 can be coupled to the arm hinge offset 624 and a grip hinge offset 612. In this embodiment, the spacing between the arms 602, 608 and parallel linkages 604, 610 is between 20 to 50 centimeters. In FIG. 37, an embodiment of the linkage system is illustrated that has two inner parallel linkages 604 on opposite sides of the inner arm 602 and two outer parallel linkages 610 on opposite sides of the outer arm 608. The inner parallel linkage 604 can be coupled to the car 542 with separate linkage hinges 616 and arm hinge offsets 624. The outer parallel linkages 610 can be coupled to the arm hinge offsets 624 and grip hinge offsets 612.

As the user moves up, down, left or right in virtual space, the VR apparatus can recenter the user as needed and described above. The VR system can perform the recentering in order to prevent the hand grips and foot holds from exceeding the physical boundaries which can be the movement limits of the hand and foot interfaces of the VR machine. Since the movement of the hand grips and foot holds to the movement limitation stops of the hand and foot actuators must not be detected by the user. Thus, during recentering, the hand and feet grips that are not in unencumbered mode must move at the same speed, along the same vector, and without altering the angular orientation of the grip. In an embodiment, the synchronized movement of the hand grips and foot holds is achieved using motors at the 'wrist' pivots. This adds weight to the end of the armature, and adds cost.

In another embodiment, a simpler approach includes a VR apparatus having linkages, chains or belts that are fixed at the 'shoulder' end of the armature, connected at the 'elbow' end, terminating at the 'wrist' end. In this pantograph approach, the grip assembly will remain orthogonal to the back plane of the machine, regardless of the position of the armature.

In embodiment, the VR apparatus can be optical sensors and/or video cameras for optical detection of user recentering. For example, the optical sensors or video cameras can detect the hand and foot centroids using spheres mounted on the hand grips and foot holds. The cameras can be mounted to surrounding VR apparatus frame for position detection. In the described invention, the software must be aware of the exact Cartesian location and rotational position of the center of the user's hand (together, the 'centroid') at all times, for the purposes of repositioning, recentering the user, and locating the hand of the avatar with precision, both in its cartesian and rotational position.

Figure 38:
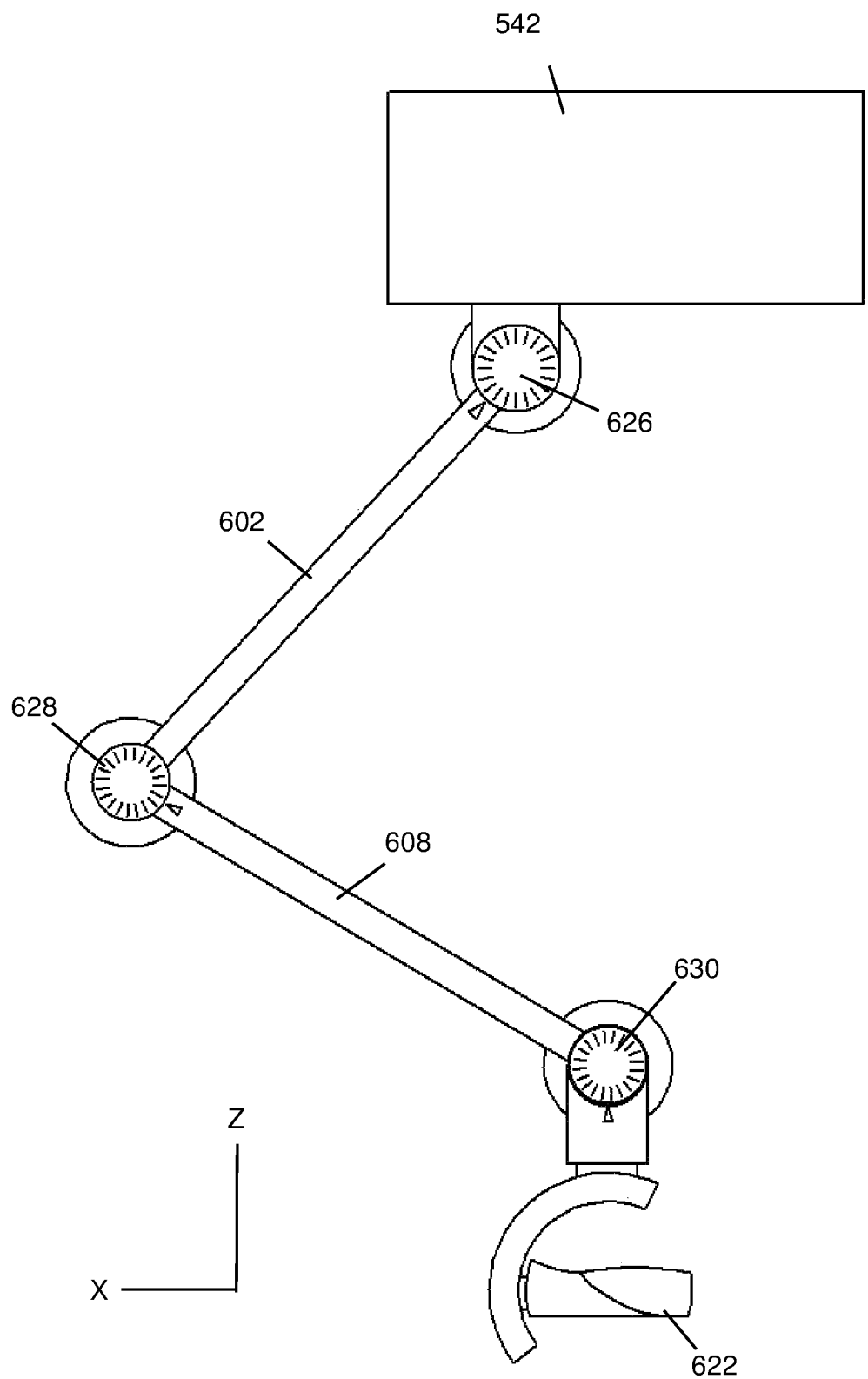
FIG. 38 illustrates a top view of an embodiment of an articulated armature that includes rotary encoders.

In another embodiment with reference to FIG. 38, an articulated armature might include integrated rotary encoders at all rotation joints and a linear encoder at any sliding components. In illustrated embodiment, five rotary encoders and one linear encoder can be required per arm and leg actuator. The rotary encoders can measure the angular positions of the rotational components such as the inner arm, outer arm and hand gimbal. The linear encoder can measure the vertical linear position of the car on the track. For example, a car hinge rotary encoder 626 can measure the angular position of the inner arm 602 relative to the car 542.

The arm hinge rotary encoder 628 can measure the angular position of the outer arm 608 relative to the inner arm 602 and the grip hinge rotary encoder 630 can measure the angular position of the hand grip 622 (or foot hold not shown) relative to the outer arm 608. In addition to the three illustrated rotary encoders 626, 628, 630, the armatures can also include a rotary encoder for measuring the rotation of the hand grip 622 about the Z-axis and a rotary encoder for measuring the rotation of the hand grip 622 about the X-axis. The rotary and linear encoders transmit the angle and position information to the VR control processor which can provide location information for the hand grips and foot holds. This approach provides exact location of the actuators as well as the hand grips and foot holds to the VR control processor which can then perform the recentering of the actuators so the user can continue to move in the VR space.

In an embodiment, the VR apparatus can perform kinetic scanning of the body for avatar creation for third-person view. In the invention, the body of the user can be digitally represented for several purposes. For example, the user to choose to watch themselves from a 'third person' perspective, as if watching from out of their body. Spectators, similarly, may watch the user in third person view, similar to watching any athlete. Scanning the user's body while it is in motion to allow the user to see their own body as they move on a visual VR display, further confirming the realism of the VR environment. In video games, this is known as third person view. An avatar overlay model may be applied in a visual display, so that a user may appear in the virtual environment as a robot, knight in armor, superhero, animal, or whatever enhances their experience. Scanning the user's body can also create a 'collision field' for reference. The CPU will be aware of the shape and position of the armatures at any moment in time, and the shape and location of the user's body at any moment in time. With this data, the system's VR software may anticipate a potential collision between armature and user in the physical space. The VR software can stop the motion of the hand and foot actuators to prevent contact with the user to prevent physical injury to the system user. An accurate three dimensional image capture of the user's body can allow for multi-player interaction in a VR space. For example, if two players exist in a virtual environment, they may see an accurate representation of an avatar of the other and themselves. If players box, for example, the scan data of each player becomes a 'collision field'. When a player punches the other, the intersection of the data fields represents a punch that has struck the other. This can be registered to the hitter by stopping motion on all armature actuators, simulating the feeling of a strike. The receiving player may feel a jolt from all armatures, to simulate the avatar's reaction to being struck in VR space. This jolt can provide notice of contact while avoiding physical impact.

Figure 39:
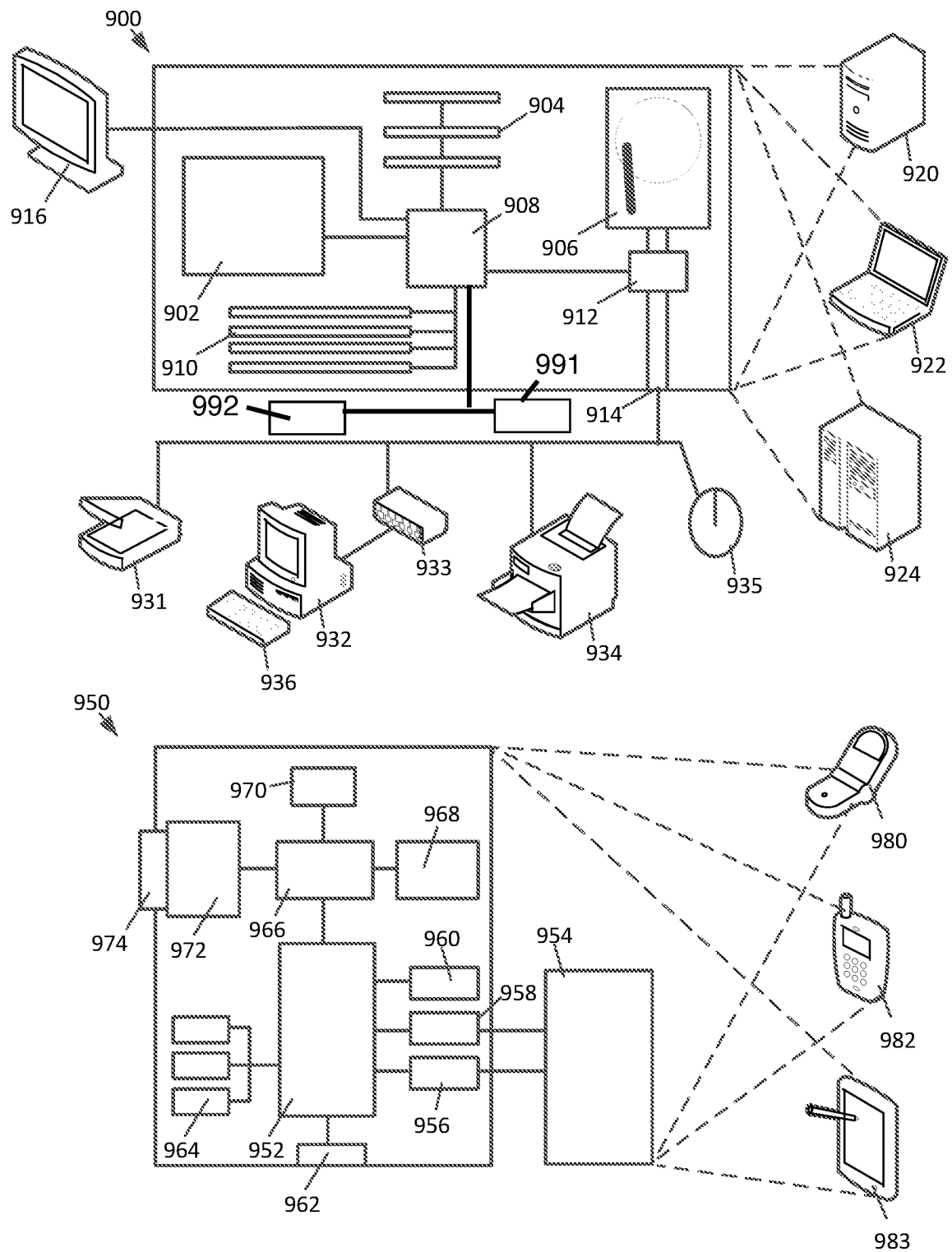
FIG. 39 illustrates an embodiment of a computer system used with a VR system.

FIG. 39 shows an example of a generic computer device 900 and a generic mobile computer device 950, which may be used to implement the processes described herein, including the mobile-side and server-side processes for installing a computer program from a mobile device to a computer. Computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to bus 914 and storage device 906. Each of the components processor 902, memory 904, storage device 906, high-speed interface 908, high-speed expansion ports 910, and low speed interface 912 are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple busses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and port 914. The low-speed expansion port 914, which may include various communication ports (e.g., USB, Bluetooth, Ethernet, wireless Ethernet), may be coupled to one or more input/output devices, such as a keyboard 936 in communication with a computer 932, a pointing device 935, a scanner 931, or a networking device 933 such as a switch or router, e.g., through a network adapter. In the illustrated example, the high speed controller 908 can be coupled to a visual display 992 which can display a visual VR environment generated by the processor 952. The visual display 992 can be part of a VR headset worn by a user of the described VR system. The external interface 962 can also be coupled to the VR movement apparatus which can provide haptic VR environments which are coordinated and synchronously output with visual VR environments as described above.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a Microdrive, solid state memory or other device, to provide additional storage. Each of the components computing device 950, processor 952, memory 964, display 954, communication interface 966, and transceiver 968 are interconnected using various busses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provided in communication with processor 952, so as to enable near area communication of device 950 with other devices. External interface 962 may provide, for example, for wired communication in some implementations, or for wireless communication in other implementations, and multiple interfaces may also be used. The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provided as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, memory on processor 952, or a propagated signal that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, Wi-Fi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smartphone 982, personal digital assistant, a tablet computer 983 or other similar mobile computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

What is claimed is:
1. A virtual reality (VR) apparatus comprising:
 a movement apparatus for providing a haptic VR environment, the movement apparatus comprising:
  a frame;
  a left hand elongated structure extending from the frame wherein a proximal end of the left hand elongated structure is coupled to the frame and a distal end of the left hand elongated structure is coupled to a left hand interface;
  a left hand actuator extending horizontally from the frame and coupled to a middle portion of the left hand elongated structure;
  a right hand elongated structure extending horizontally from the frame wherein a proximal end of the right hand elongated structure is coupled to the frame and a distal end of the right hand elongated structure coupled to a right hand interface;
  a right hand actuator extending horizontally from the frame and coupled to a middle portion of the left hand elongated structure;
  a left foot vertical actuator controlling the vertical position of the left foot interface relative to the frame;
  a right foot vertical actuator controlling the vertical position of the right foot interface relative to the frame; and
 a visual display for displaying a visual VR environment;

a computer processor running a VR program for providing a VR environment and coordinating haptic VR environment data transmitted to the left hand interface, the right hand interface, the left foot interface and the right foot interface with visual VR environment data transmitted to the visual display.

2. The VR apparatus of claim 1 wherein the left hand elongated structure and the right hand elongated structure each include a hinge mechanism that allows rotational movement of the left hand interface and the right hand interface relative to the frame.

3. The VR apparatus of claim 1 wherein the left hand elongated structure, and the right hand elongated structure each include interface actuators that control or prevent rotational movement of the left hand interface and the right hand interface.

4. The VR apparatus of claim 1 wherein the left hand elongated structure and the right hand linear elongated structure are each linear actuators.

5. The VR apparatus of claim 1 wherein the left hand vertical actuator and the right hand vertical actuator are each linear actuators.

6. The VR apparatus of claim 1 wherein the left foot interface and the right foot interface include platforms and coupling mechanisms, adapted for supporting the feet of a user.

7. The VR apparatus of claim 1 wherein the left hand interface and the right hand interface include hand grips that are adapted for supporting the hands of a user.

8. The VR apparatus of claim 1 wherein the left hand interface and the right hand interface each include a frame gimbal mechanism.

9. The VR apparatus of claim 1 wherein the VR program for providing the VR environment includes topographical simulation data that includes visual topography data for display on the visual display and haptic topography data that includes solid surfaces, the computer processor controls the haptic apparatus to prevent the left hand interface, the right hand interface, the left foot interface and the right foot interface from moving through the solid surfaces defined by the haptic topography data.

10. The VR apparatus of claim 9 wherein the computer processor determines a coefficient of friction based upon gravity and surface material of the solid surfaces when the left hand interface, the right hand interface, the left foot interface, or the right foot interface contact the solid surfaces of the haptic topography data.

11. The VR apparatus of claim 9 wherein the computer processor determines a sliding direction over the solid surfaces when the left hand interface, the right hand interface, the left foot interface, or the right foot interface slides on the solid surfaces of the haptic topography data.

12. A virtual reality (VR) apparatus comprising:
a movement apparatus for providing a haptic VR environment, the movement apparatus comprising:
a frame;
a left hand assembly coupled to and extending horizontally from the frame having a left hand elongated structure, a left hand interface coupled to the left hand elongated structure and a left hand actuator coupled to a middle portion of the left hand elongated structure;
a right hand assembly coupled to and extending horizontally from the frame having a right hand elongated structure, a right hand interface coupled to the right hand elongated structure and a right hand actuator coupled to a middle portion of the right hand elongated structure;
a left foot assembly coupled to the frame having a left foot interface;
a right foot assembly coupled to the frame having a right foot interface; and
a visual display for displaying a visual VR environment;
a computer processor running a VR program for providing the visual VR environment and haptic VR environment data that is transmitted to the movement apparatus and coordinated with visual VR environment data, wherein the VR program re-centers the positions of the left hand interface, the right hand interface, the left foot interface and the right foot interface and synchronously re-centers the visual VR environment.

13. The VR apparatus of claim 12 wherein the VR program re-centers the positions of the left hand interface, the right hand interface, the left foot interface and the right foot interface after the left hand interface, the right hand interface, the left foot interface and after the right foot interface are moved away from centered positions.

14. The VR apparatus of claim 12 wherein the VR program re-centers the positions of the left hand interface, the right hand interface, the left foot interface and the right foot interface after the left hand interface, the right hand interface, the left foot interface and the right foot interface are moved within a predefined distance from the movement perimeter.

15. The VR apparatus of claim 12 wherein as a user ascends in the haptic VR environment, the movement apparatus constantly re-centers the user, by moving the left hand interface, the right hand interface, the left foot interface, and the right foot interface towards the physical center of the VR apparatus.

16. The VR apparatus of claim 12 wherein re-centering motions of the left hand interface, the right hand interface, the left foot interface and the right foot interface in X, Y and Z directions have a sine-wave motion acceleration pattern, accelerating slowly from standstill at the beginning of the re-centering motions and then decelerating at the end of the re-centering motions.

17. The VR apparatus of claim 12 wherein the visual VR environment and the haptic VR environment data provided by the VR program simulates climbing at an angle, while a center point of the left hand interface, the right hand interface, the left foot interface and the right foot interface remains generally stationary and centered within the movement perimeter of the VR apparatus.

18. The VR apparatus of claim 12 wherein the visual VR environment and the haptic VR environment data provided by the VR program simulates virtual grab structures that may grabbed by grab movements of the left hand interface, the right hand interface, the left foot interface, or the right foot interface, wherein the left hand interface, the right hand interface, the left foot interface, or the right foot interface is virtually coupled to the virtual grab structures.

19. The VR apparatus of claim 18 wherein the VR program simulates virtual grab structures that may released by release movements of the left hand interface, the right hand interface, the left foot interface, or the right foot interface wherein the left hand interface, the right hand interface, the left foot interface, or the right foot interface is virtually released from the virtual grab structures.

20. The VR apparatus of claim 12 wherein the VR program simulates virtual falling when the left hand interface, the right hand interface, the left foot interface, and the right foot interface are not in contact with any virtual structures, wherein the left hand interface, the right hand interface, the left foot interface, or the right foot interface move in a gravitational direction simultaneously.

21. A virtual reality (VR) apparatus comprising:
a movement apparatus for providing a haptic VR environment, the movement apparatus comprising:
  a frame;
  an upper left assembly extending horizontally from the frame having a left hand elongated structure, a left hand interface coupled to a middle portion of the left hand elongated structure and a left hand horizontal actuator coupled to a middle portion of the left hand elongated structure;
  an upper right assembly extending horizontally from the frame having a right hand elongated structure, a right hand interface coupled to a middle portion of the right hand elongated structure and a right hand horizontal actuator coupled to a middle portion of the right hand elongated structure;
  a lower left assembly having a left foot interface;
  a lower right assembly having a right foot interface; and
a visual display for displaying a visual VR environment;
a computer processor running a VR program for providing a VR environment and coordinating haptic VR environment data transmitted to the movement apparatus with visual VR environment data transmitted to the visual display.

22. The VR apparatus of claim 21 wherein the upper left assembly, the upper right assembly, the lower left assembly and the lower right assembly each include a vertical actuator that moves the left hand interface, the right hand interface, the left foot interface and the right foot interface in a vertical Y direction.

23. The VR apparatus of claim 21 wherein the left foot interface and the right foot interface include platforms and coupling mechanisms, adapted for supporting the feet of a user.

24. The VR apparatus of claim 21 wherein the left hand interface and the right hand interface include platforms and coupling mechanisms that are adapted for supporting the hands of a user.

25. The VR apparatus of claim 21 wherein the left hand interface and the right hand interface include hand grips that are adapted for supporting the hands of a user.

26. The VR apparatus of claim 21 further comprising:
a plurality of motors that control the movement of the plurality of actuators, the plurality of motors are controlled by the computer processor.

27. The VR apparatus of claim 21 wherein the VR program for providing the VR environment includes topographical simulation data that includes visual topography data for display on the visual display and haptic topography data that includes solid surfaces, the computer processor controls the haptic apparatus to prevent the left hand interface, the right hand interface, the left foot interface and the right foot interface from moving through the solid surfaces defined by the haptic topography data.

28. The VR apparatus of claim 27 wherein the computer processor determines a coefficient of friction based upon gravity and surface material of the solid surfaces when the left hand interface, the right hand interface, the left foot interface, or the right foot interface contact the solid surfaces of the haptic topography data.

29. The VR apparatus of claim 27 wherein the computer processor determines a sliding direction over the solid surfaces when the left hand interface, the right hand interface, the left foot interface, or the right foot interface slides on the solid surfaces of the haptic topography data.

* * * * *